US009752689B2

United States Patent
Broome

(10) Patent No.: US 9,752,689 B2
(45) Date of Patent: Sep. 5, 2017

(54) COMPACT FLOW CONTROL VALVE

(71) Applicant: Akron Brass Company, Wooster, OH (US)

(72) Inventor: Layton Michael Broome, Wooster, OH (US)

(73) Assignee: Akron Brass Company, Wooster, OH (US)

( * ) Notice: Subject to any disclaimer, the term of this patent is extended or adjusted under 35 U.S.C. 154(b) by 36 days.

(21) Appl. No.: 14/617,268

(22) Filed: Feb. 9, 2015

(65) Prior Publication Data
US 2015/0226341 A1   Aug. 13, 2015

Related U.S. Application Data

(60) Provisional application No. 61/936,907, filed on Feb. 7, 2014.

(51) Int. Cl.
| | |
|---|---|
| *F16K 5/06* | (2006.01) |
| *F16K 31/53* | (2006.01) |
| *F16K 31/60* | (2006.01) |
| *F16K 31/54* | (2006.01) |

(52) U.S. Cl.
CPC ............ *F16K 5/0647* (2013.01); *F16K 31/53* (2013.01); *F16K 31/535* (2013.01); *F16K 31/54* (2013.01); *F16K 31/60* (2013.01)

(58) Field of Classification Search
CPC ...... F16K 5/0647; F16K 31/535; F16K 31/54; F16K 31/60
USPC ................. 251/248–250.5, 315.16, 340–341
See application file for complete search history.

(56) References Cited

U.S. PATENT DOCUMENTS

| | | | |
|---|---|---|---|
| 7,192,004 B2* | 3/2007 | Chen ..................... | F16K 31/535 251/129.03 |
| 7,516,941 B2* | 4/2009 | Combs .................. | F16K 5/0647 251/248 |
| 2008/0053808 A1* | 3/2008 | Peffley .................. | F16K 31/047 200/400 |
| 2008/0060706 A1* | 3/2008 | Combs ................... | A62C 35/68 137/556 |
| 2010/0140522 A1* | 6/2010 | Chang ................... | F16K 5/0647 251/315.16 |
| 2013/0001455 A1* | 1/2013 | Thomas ................ | F16K 5/0605 251/315.16 |
| 2013/0026397 A1* | 1/2013 | Burgess ................ | F16K 31/535 251/65 |

* cited by examiner

*Primary Examiner* — Michael R Reid
(74) *Attorney, Agent, or Firm* — Tucker Ellis LLP; Michael G. Craig; Heather M. Barnes

(57) ABSTRACT

One or more techniques and/or systems are disclosed for a valve. An exemplary valve may be able to provide a more compact profile than current valves, allowing for installation in locations that have size limitations, and/or may allow for more room in areas where prior non-compact valves are installed. Such a valve may be used for fluid intake to a pressurized fluid dispensing system. A compact valve can comprise a valve actuator that is disposed in line with the fluid intake of the valve, and not offset and extending from the valve, such that the flow of fluid passes through a point of rotation of the actuator. Further, a transmission may be used to transfer user actuation input to an internal flow control component, such as a ball-type flow controller, to move the flow control between an open and closed position.

20 Claims, 29 Drawing Sheets

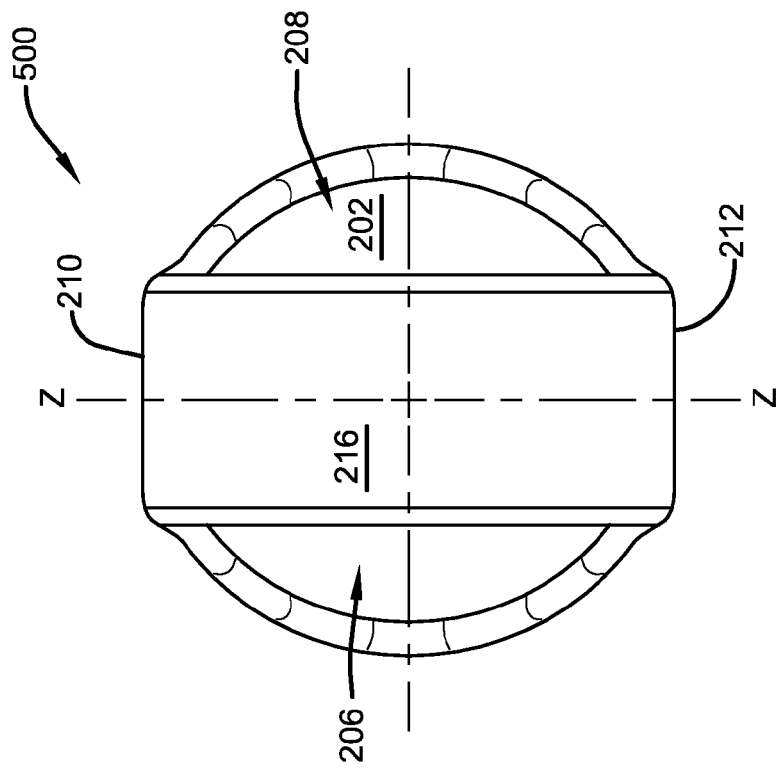
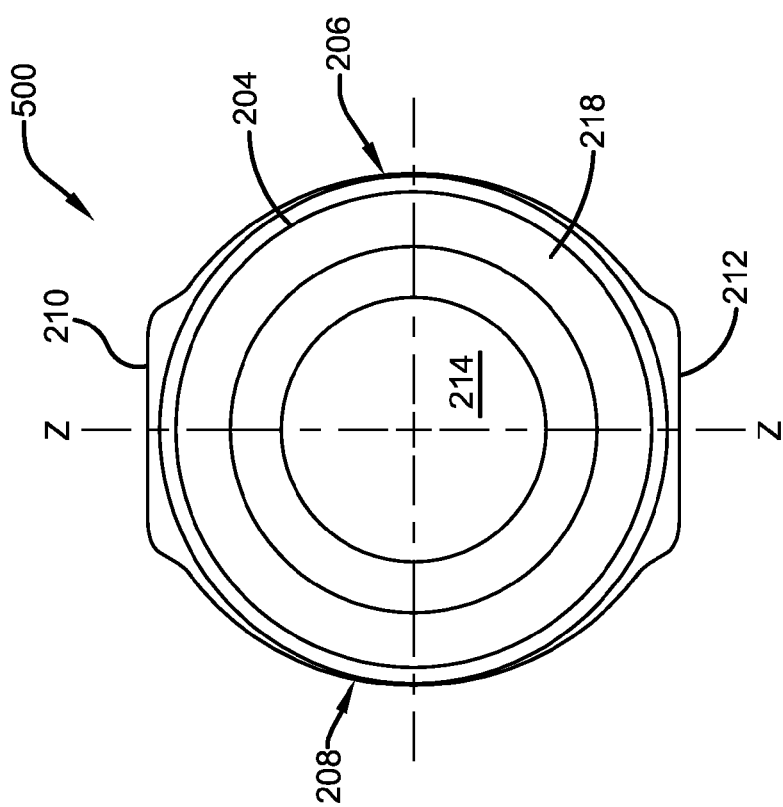

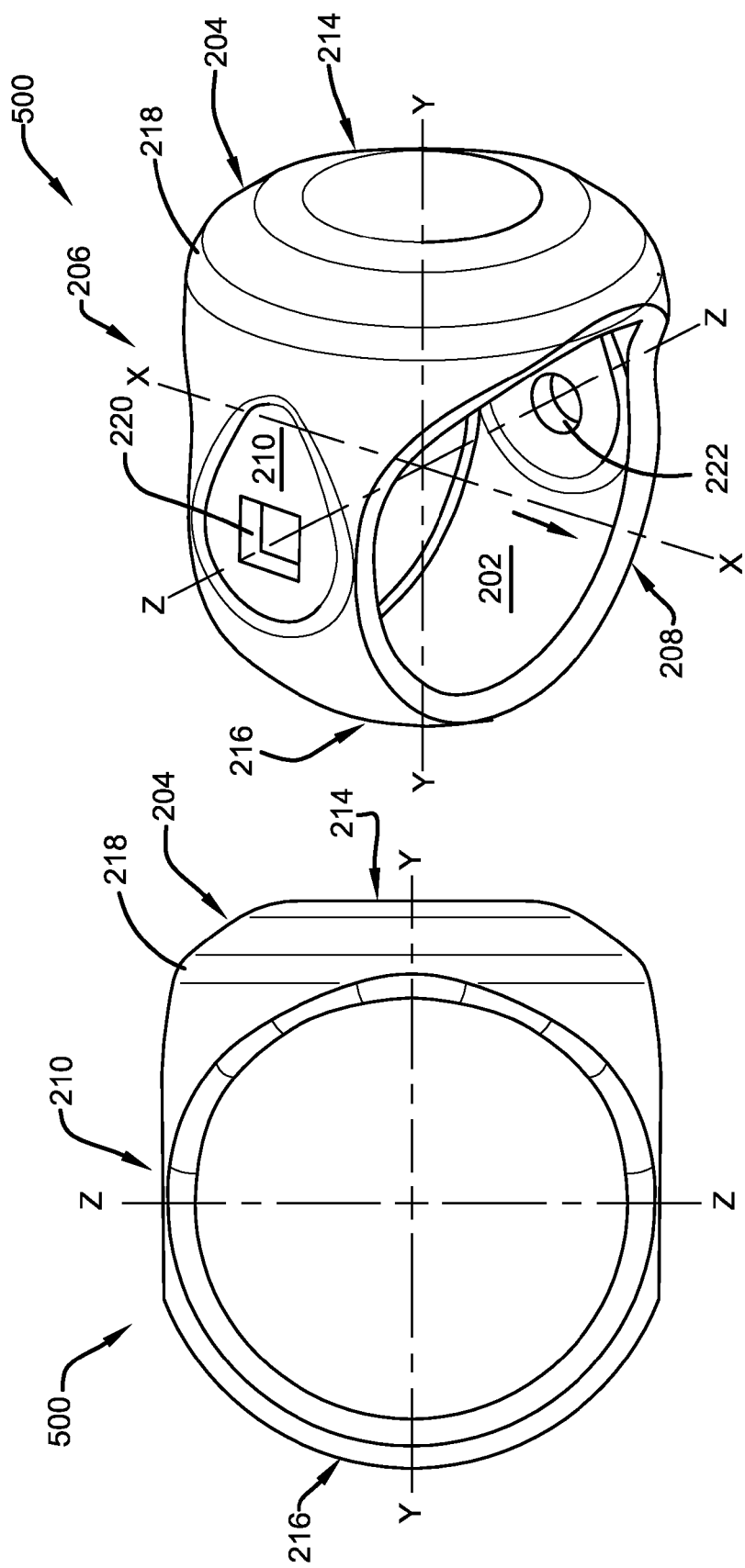

COMPACT FLOW CONTROL VALVE

CROSS-REFERENCE TO RELATED APPLICATIONS

This application claims priority to Provisional Patent Application, U.S. Ser. No. 61/936,907, entitled COMPACT FLOW CONTROL VALVE, filed Feb. 7, 2014, which is incorporated herein by reference.

BACKGROUND

Flow control valves can be utilized in various applications, such as firefighting, for regulating fluid flow. As an example, fire engines may use a flow control intake valve at a pump panel, attached to a pump inlet in the fire truck. In this example, an inlet side of the intake valve can be coupled with a water source such as a hydrant or tank, and flow into the truck can be controlled by the attached inlet valve. Currently, the inlet side of the intake valve is typically designed to be angled relative to the outlet connection in order to achieve a more compact design.

Flow control valves comprise flow controlling element, which may be devised in a variety shapes and types, such as a gate, piston or ball. A typical ball valve can consist of a ball-shaped element that is positioned inside the valve body, and the ball-shaped element can include an interior bore for a flow path, along with an exterior sealing surface. A size of the interior bore opening is typically, roughly equal to a size of the valve inlet flow area to facilitate a desired flow. Typically, the ball geometry includes a single spherical exterior diameter sealing surface configured to mate with a sealing element of the valve body positioned adjacent one or both sides of the ball. The ball is typically rotated around a pivot point, through about ninety degrees of travel, by a handle or an actuator to change the flow path from an open position to a sealed, closed position.

Current manual actuation of intake valves is usually provided by handles or hand wheels located to the side of the valve or actuator, at an angle to the flow path. The hand wheels provide a relatively slow-opening process for the intake valve for mitigate of "fluid hammer" pressure surges. Ball intake valves typically use a series of gears to rotate the flow controlling element, resulting in a gear box protruding from the valve body. Thus, these offset types of manual actuators utilize additional space at the pump panel in order to obtain the mechanical advantage required to operate effectively.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a valve may be devised that provides a more compact profile when compared with typical valves, such as those used for fluid intake to a pressurized fluid dispensing system. As an example a valve actuator in a compact design may be disposed in line with the fluid intake of the valve, and not offset and extending from the valve. Further, a transmission may be used to transfer user input force of the actuator to an internal flow control component, such as a ball-type flow controller. As an example, a compact design may allow for installation of the valve in locations that have size limitations, and/or may allow for more room in areas where prior non-compact valves are installed.

In one implementation, a valve can comprise a flow control element that can be configured to control a flow of fluid through the valve. Further, in this implementation, a transmission can be operably coupled with the flow control element, and the transmission may be configured to adjust a position of the flow control element in response to actuation input, such as by a user. Additionally, the valve can comprise an actuator that is operably coupled with the transmission; and the actuator can be configured to receive the actuation input, and the flow of fluid passing through the valve can pass through a point of rotation of the actuator.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIGS. 11A, 11B, 11C, 11D, 11E and 11F are component diagrams illustrating various views of another example implementation of one or more portions of a valve in accordance with one or more portions of one or more devices described herein.

DETAILED DESCRIPTION

Figure 1A:
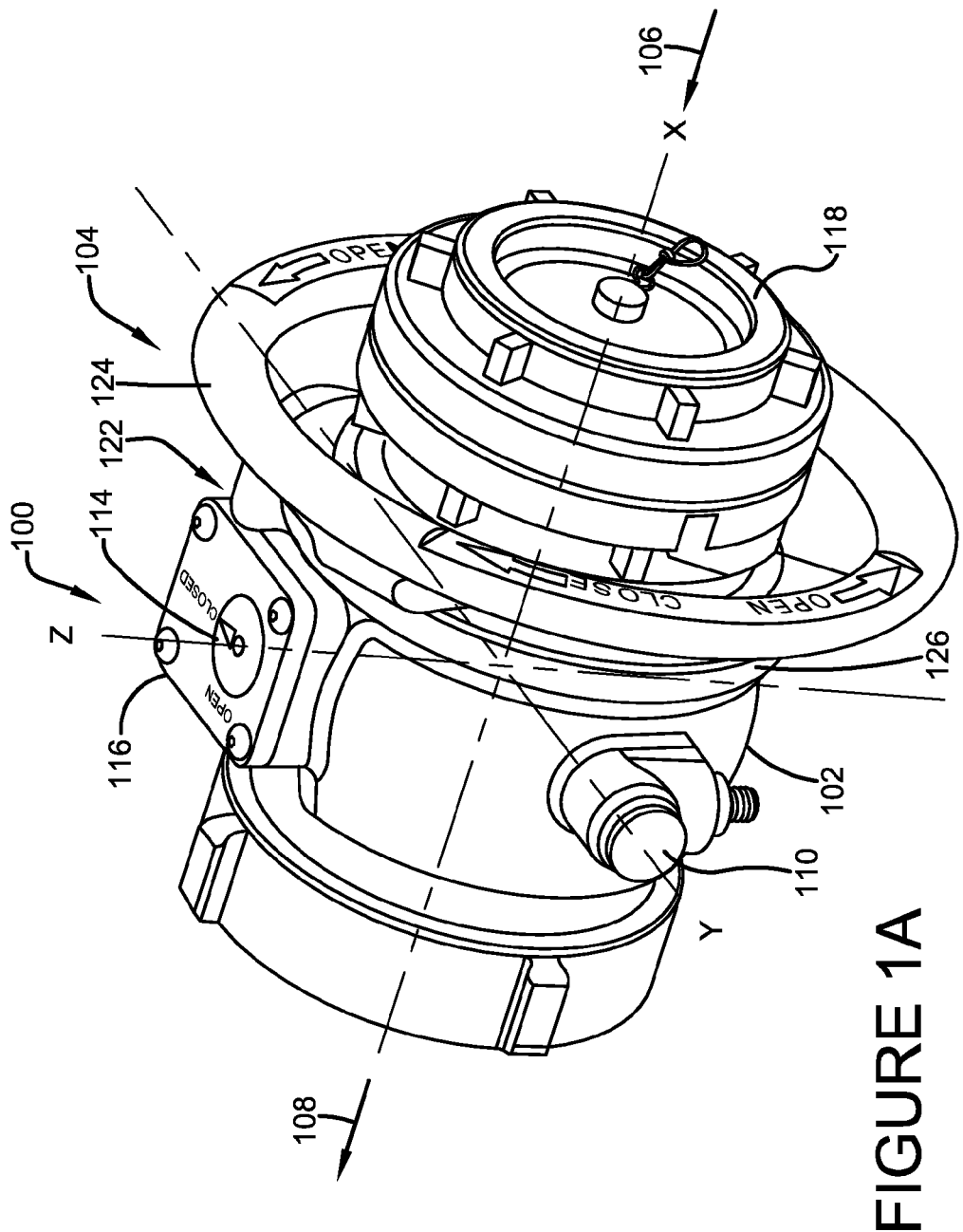
FIG. 1A is a component diagram illustrating a perspective first side view of an example implementation of a valve in accordance with one or more portions of one or more devices described herein.
Figure 1B:
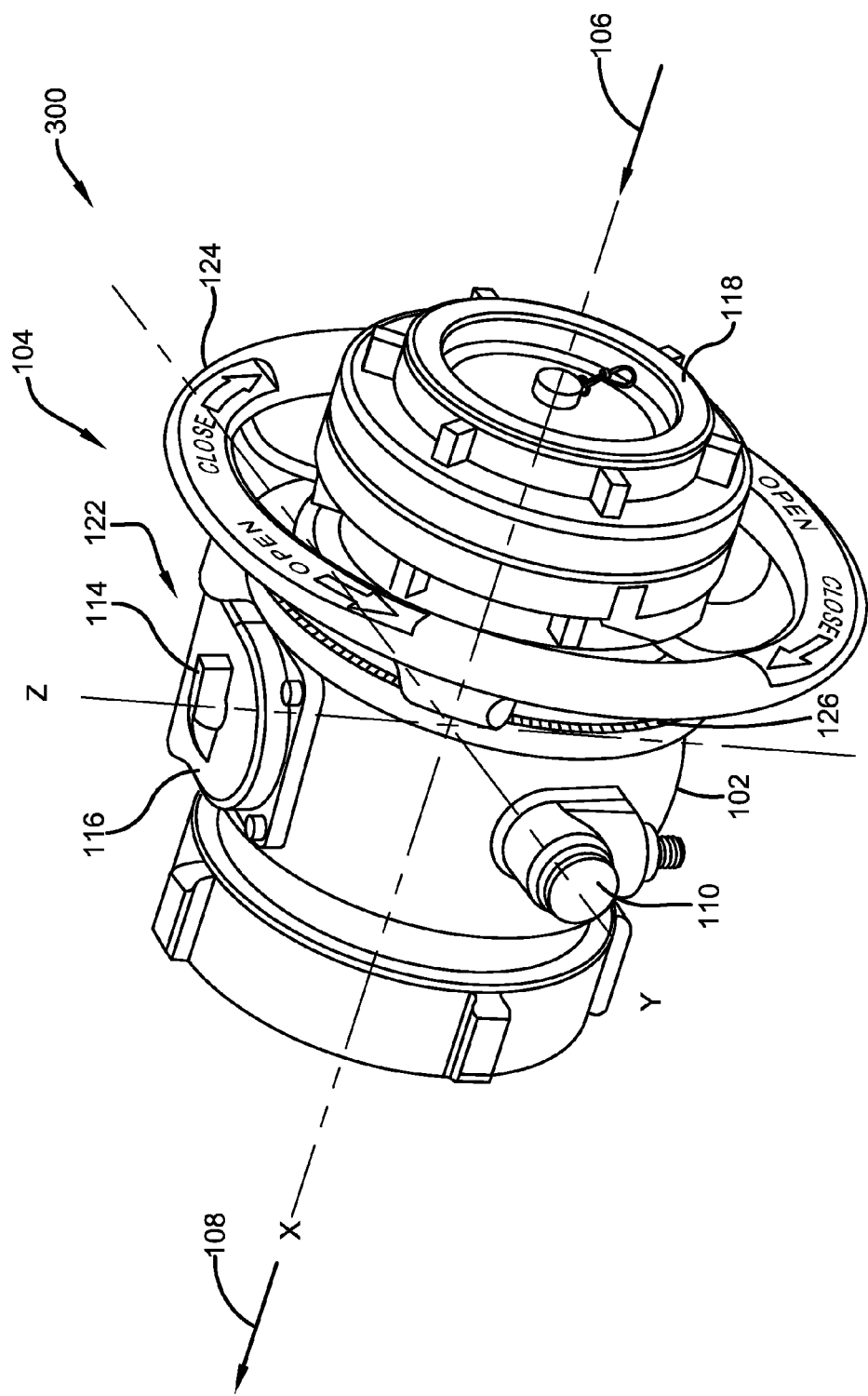
FIG. 1B is a component diagram illustrating a perspective first side view of another example implementation of a valve in accordance with one or more portions of one or more devices described herein.
Figure 1C:
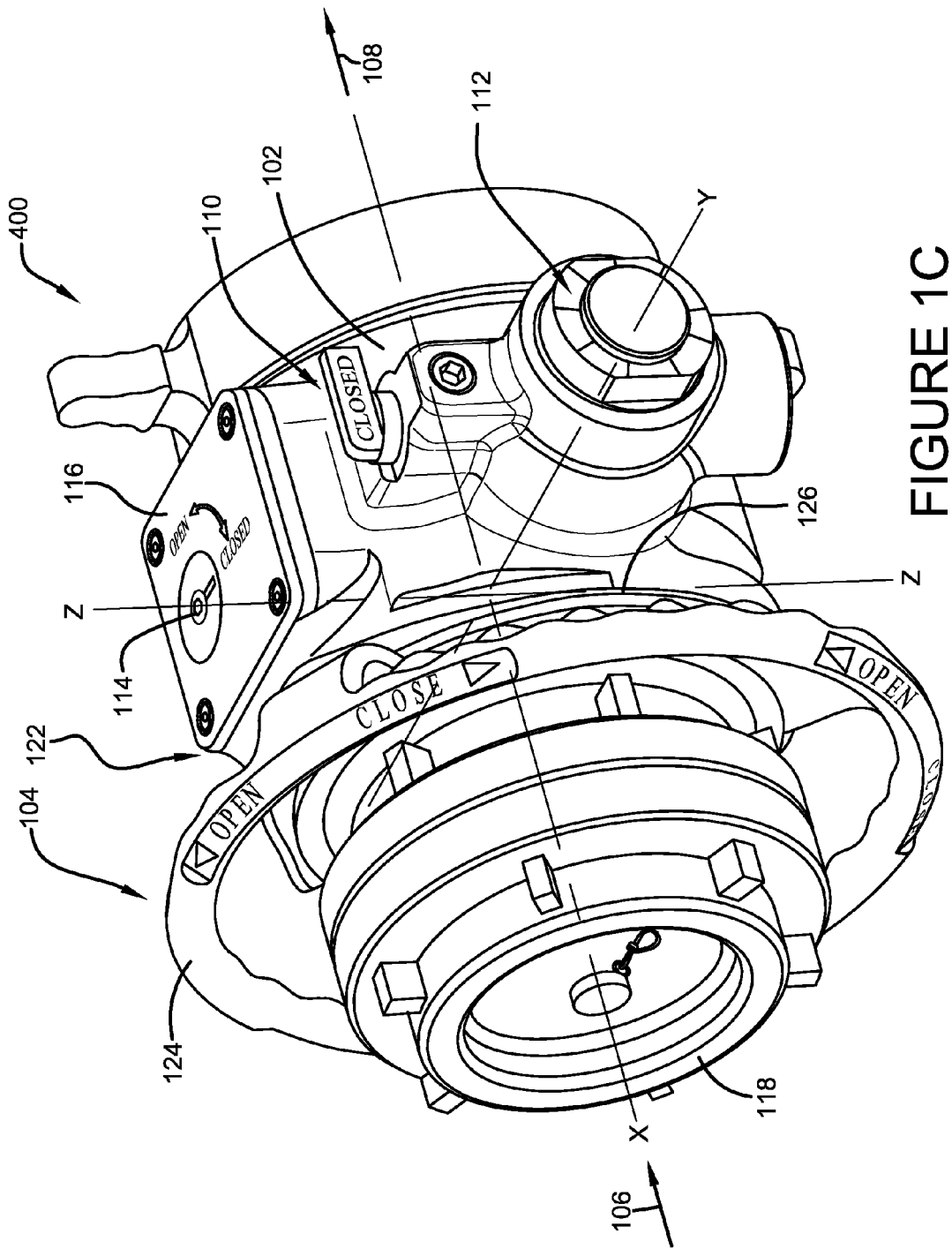
FIG. 1C is a component diagram illustrating a perspective second side view of yet another example implementation of a valve in accordance with one or more portions of one or more devices described herein.
Figure 2A:
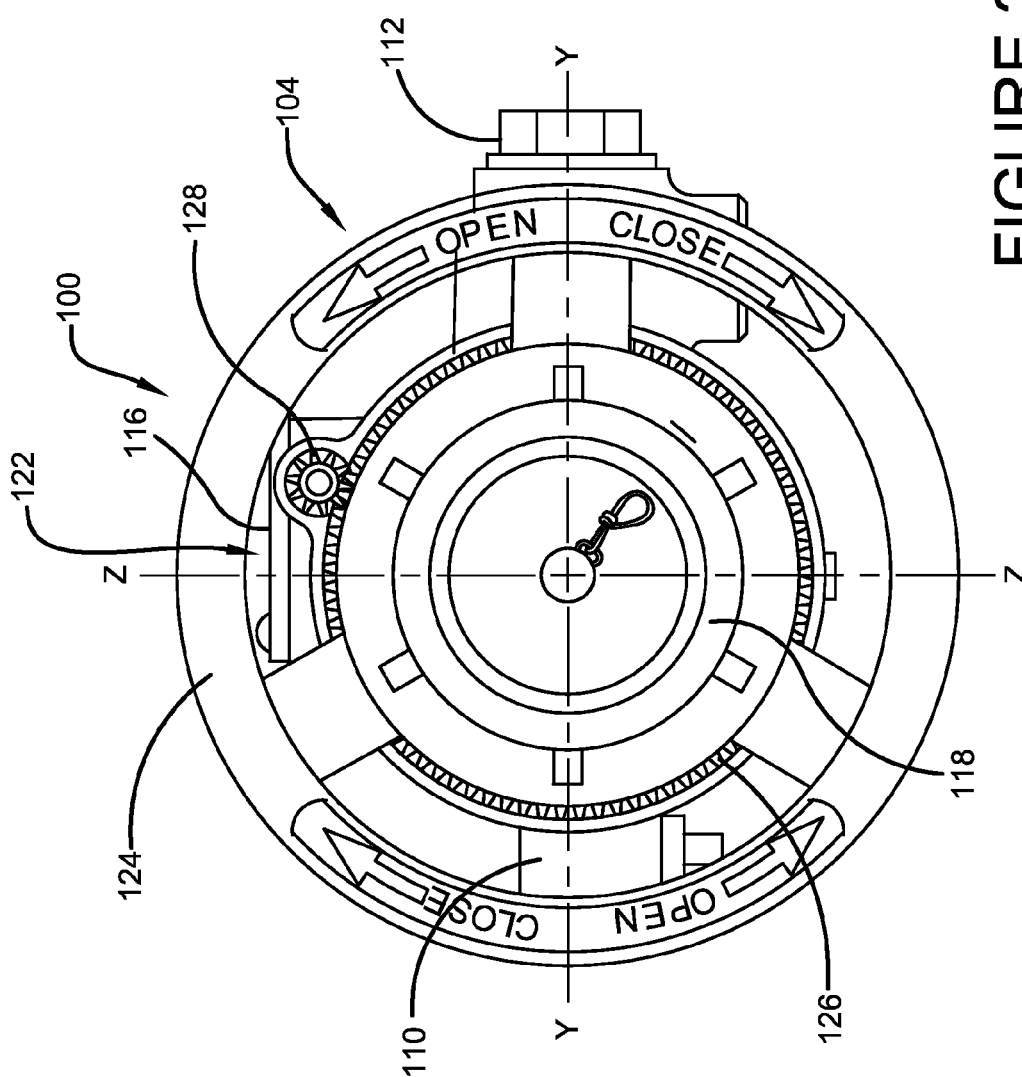
FIG. 2A is a component diagram illustrating a front elevational view of an example implementation of a valve in accordance with one or more portions of one or more devices described herein.
Figure 2B:
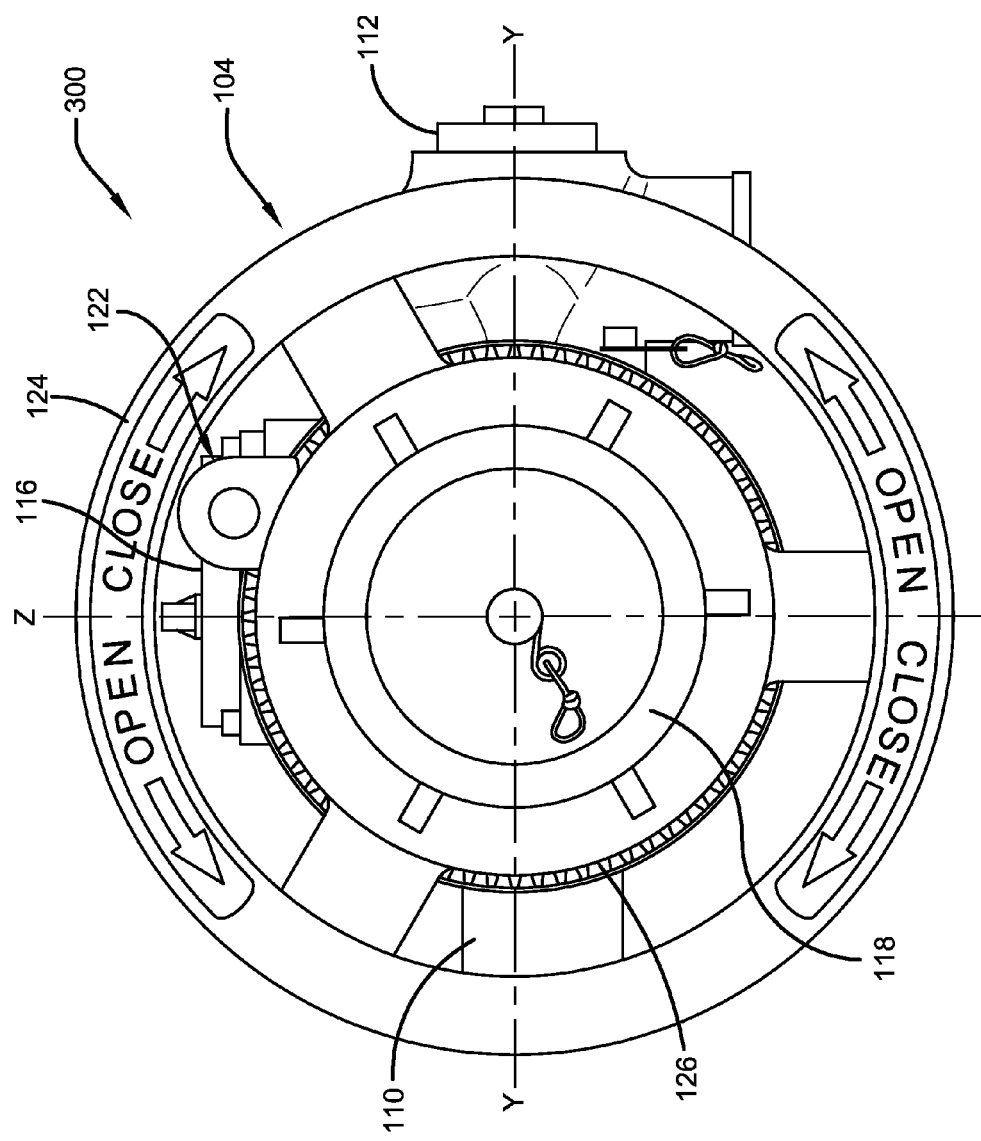
FIG. 2B is a component diagram illustrating a front elevational view of another example implementation of a valve in accordance with one or more portions of one or more devices described herein.
Figure 2C:
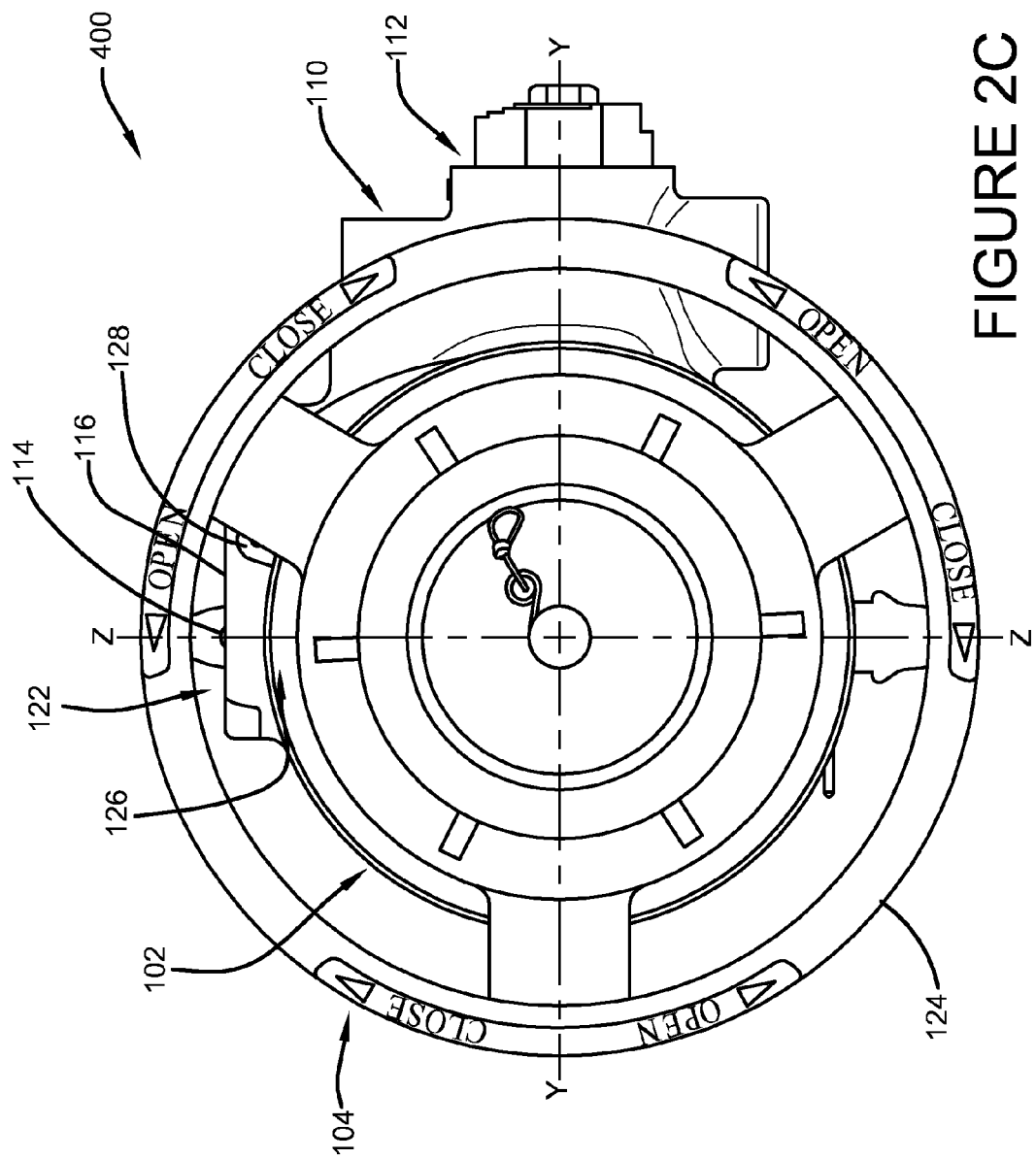
FIG. 2C is a component diagram illustrating a front elevational view of yet another example implementation of a valve in accordance with one or more portions of one or more devices described herein.
Figure 3A:
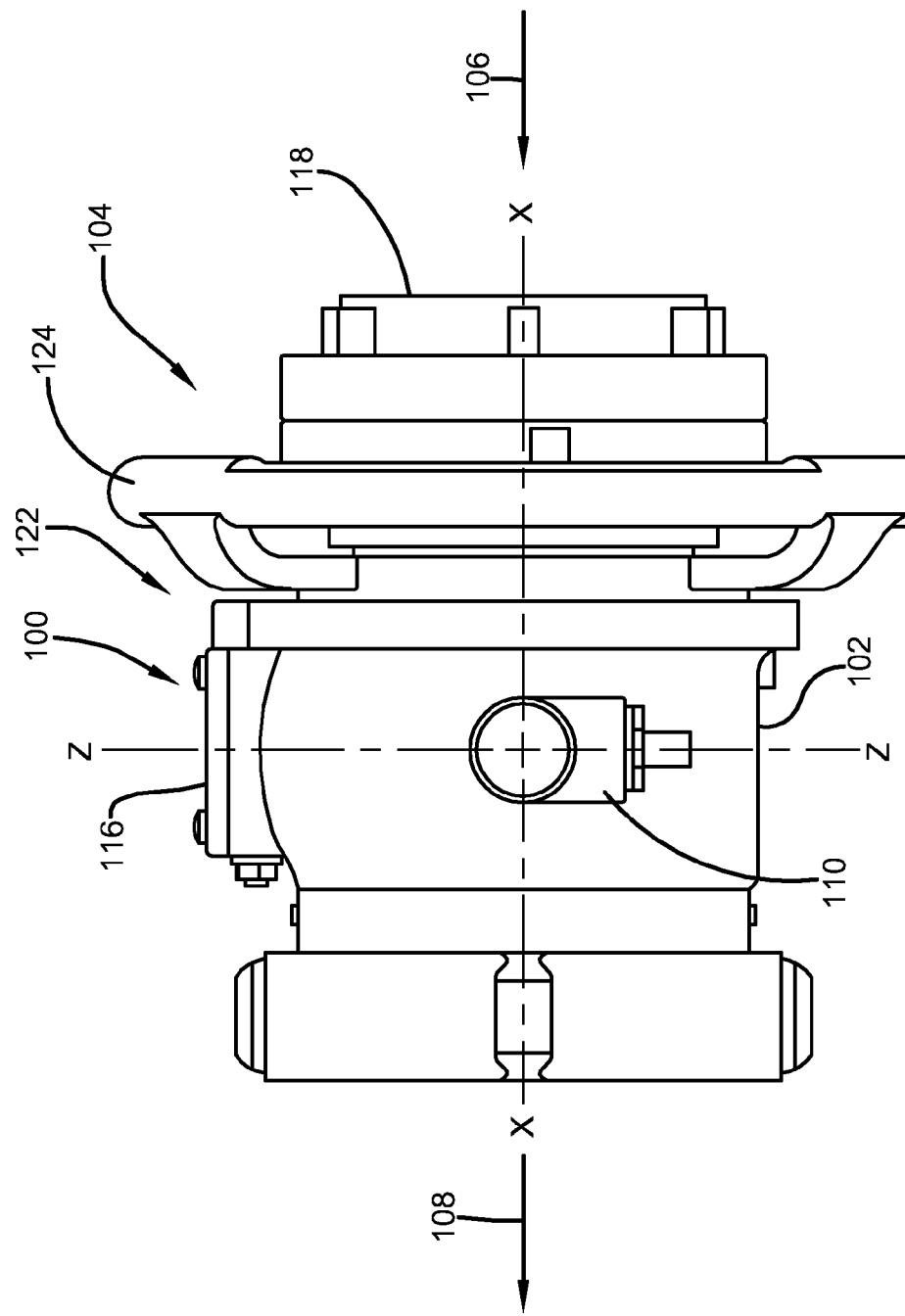
FIG. 3A is a component diagram illustrating a first side elevational view of an example implementation of a valve in accordance with one or more portions of one or more devices described herein.
Figure 3B:
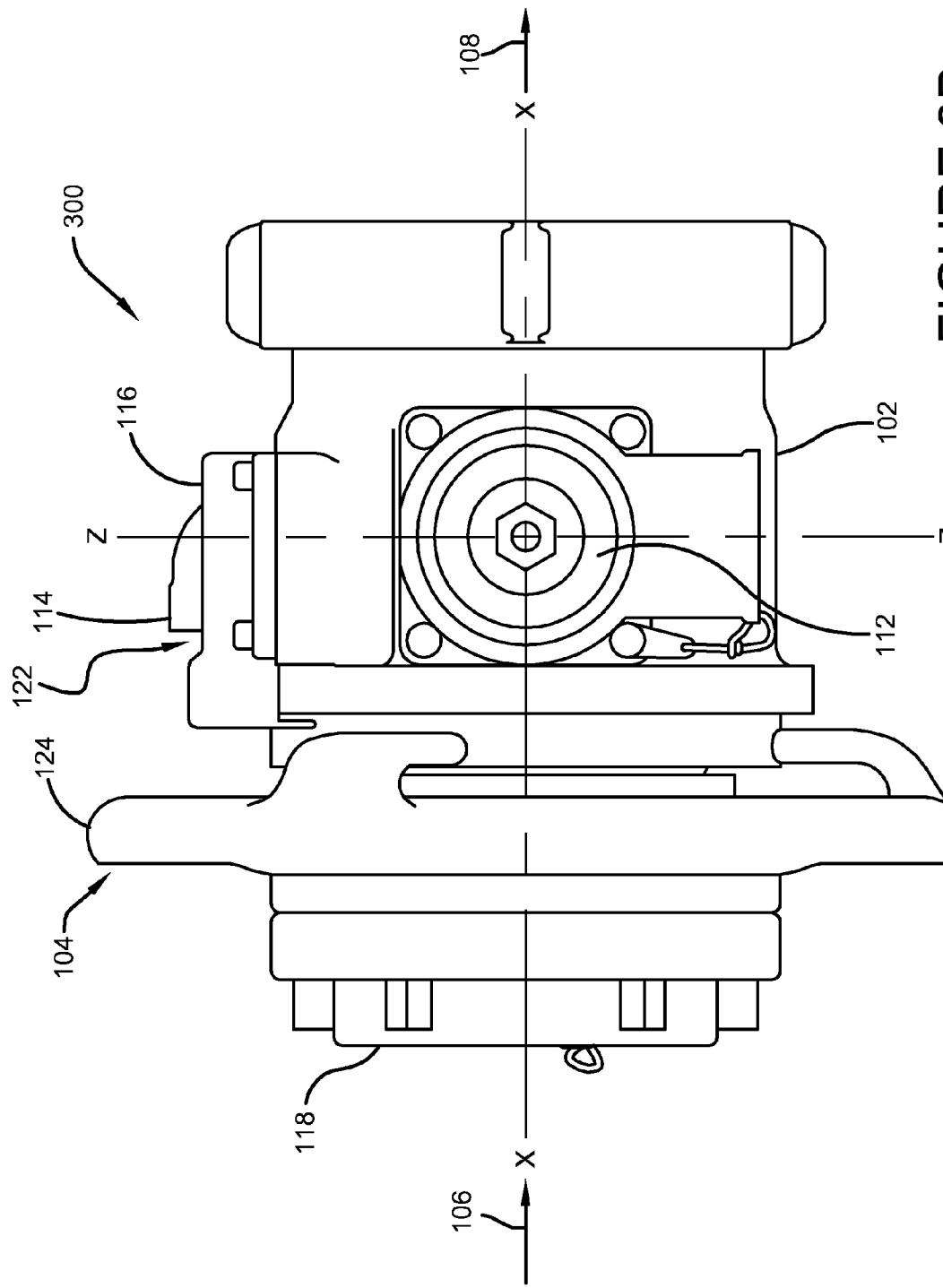
FIG. 3B is a component diagram illustrating a second side elevational view of another example implementation of a valve in accordance with one or more portions of one or more devices described herein.
Figure 3C:
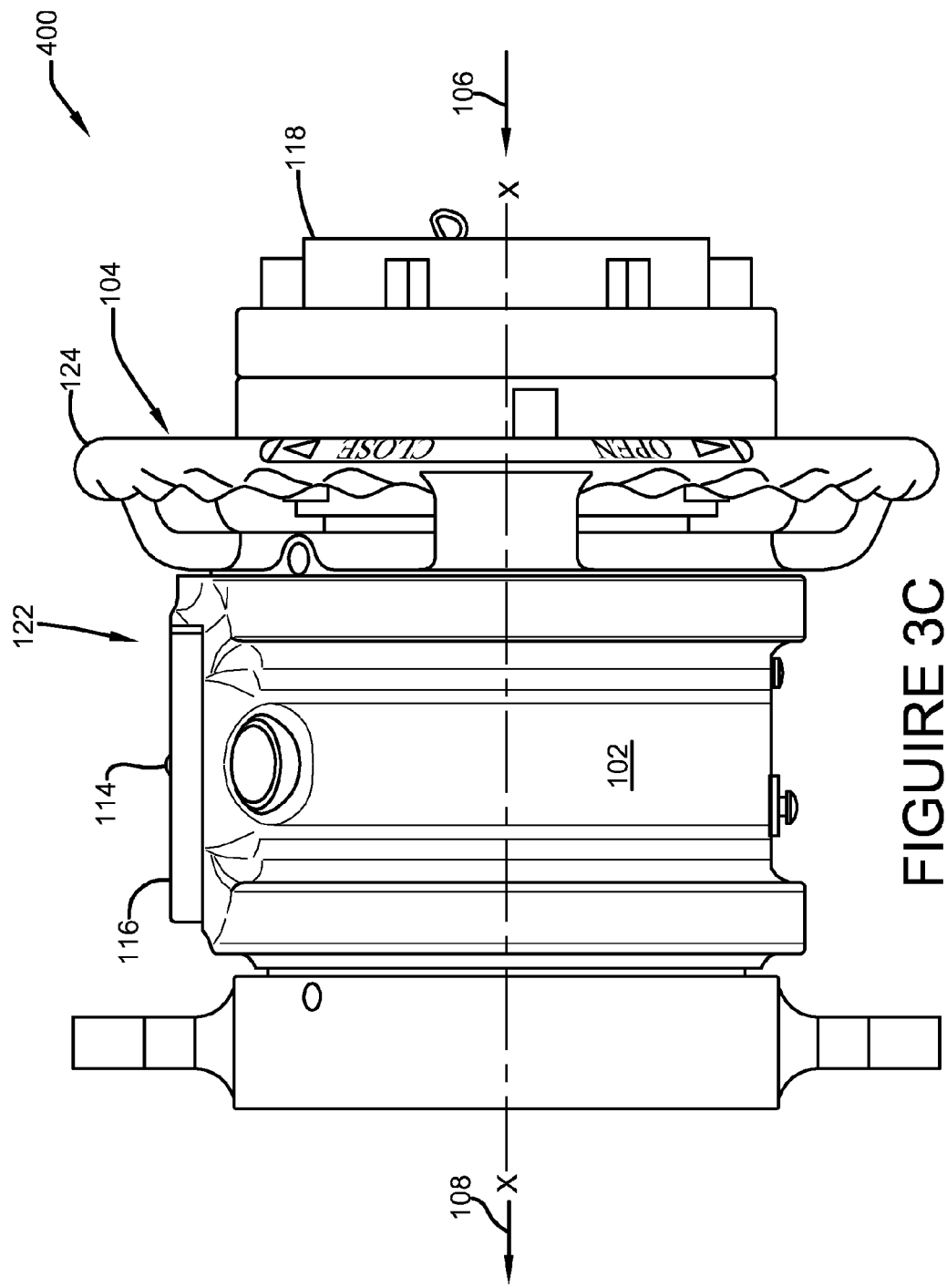
FIG. 3C is a component diagram illustrating a second side elevational view of yet another example implementation of a valve in accordance with one or more portions of one or more devices described herein.
Figure 4A:
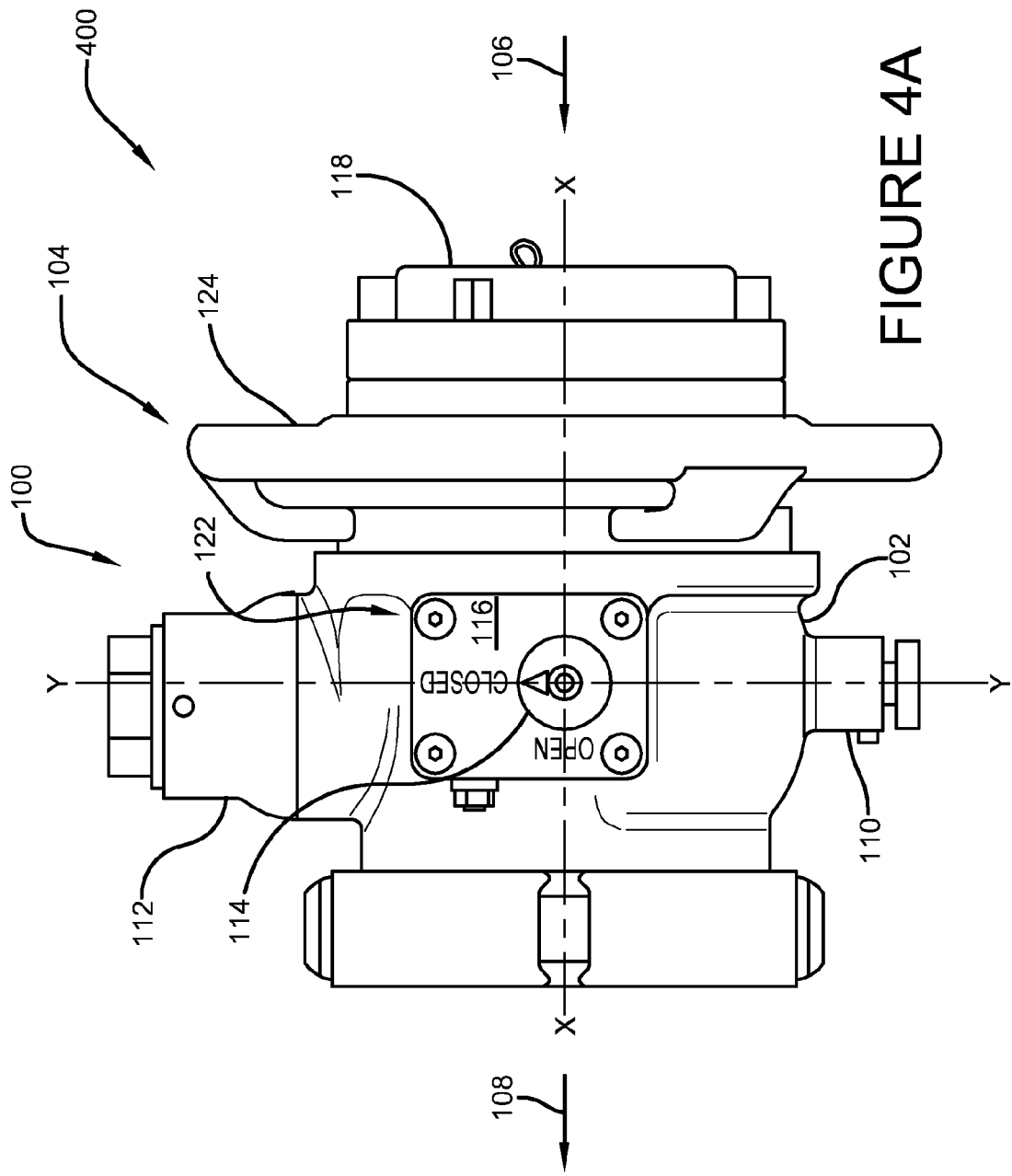
FIG. 4A is a component diagram illustrating a top view of an example implementation of a valve in accordance with one or more portions of one or more devices described herein.
Figure 4B:
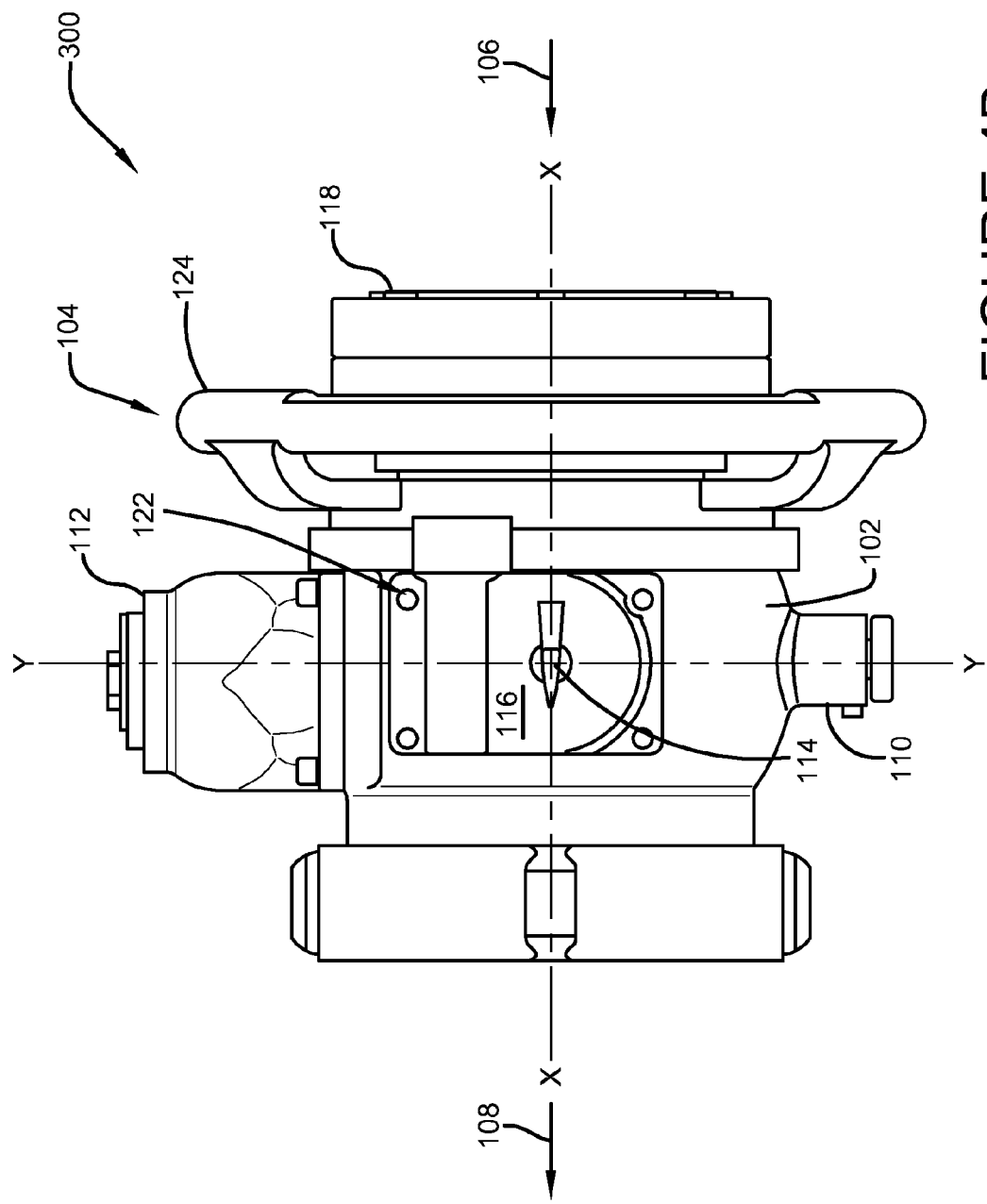
FIG. 4B is a component diagram illustrating a top view of another example implementation of a valve in accordance with one or more portions of one or more devices described herein.
Figure 4C:
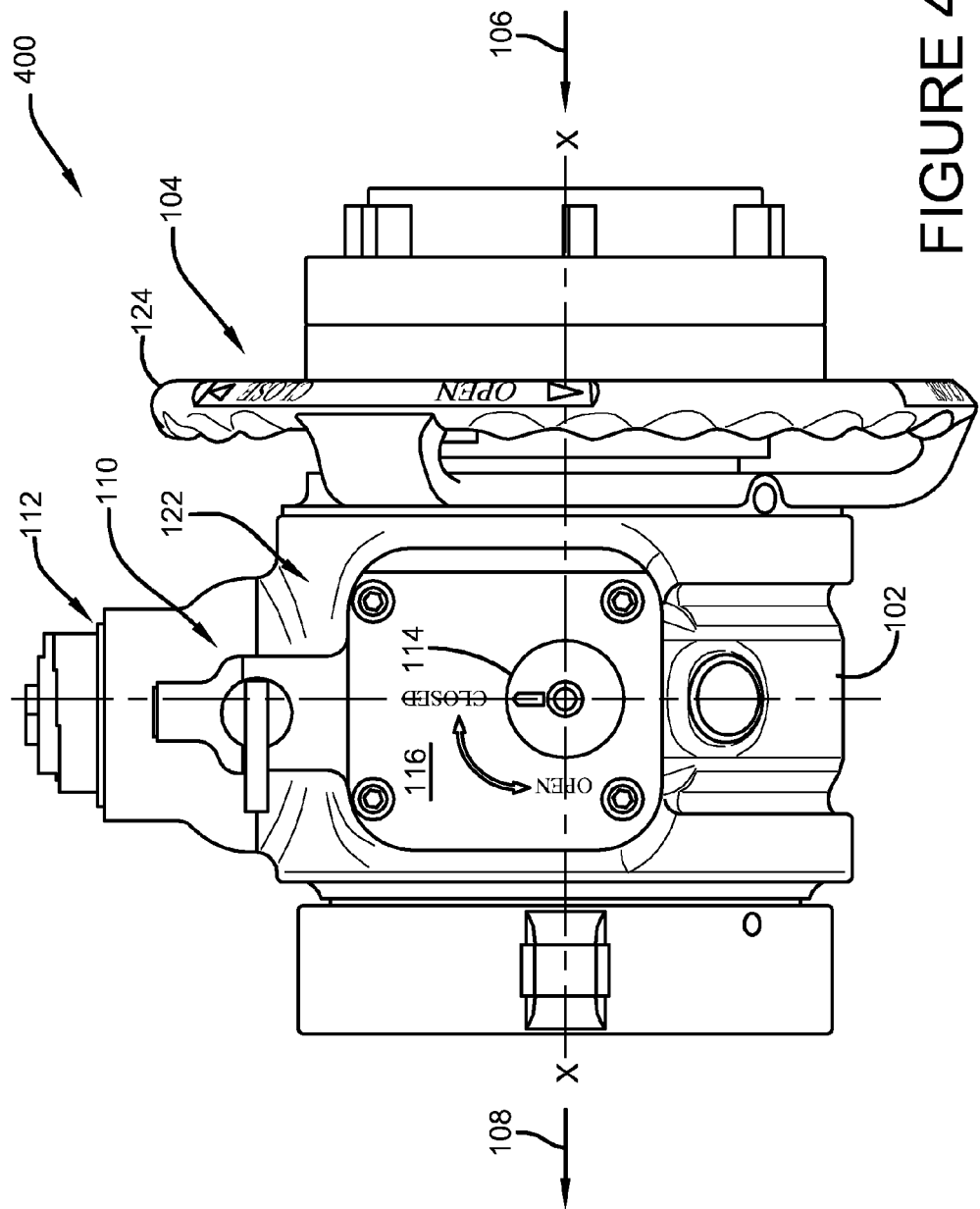
FIG. 4C is a component diagram illustrating a top view of yet another example implementation of a valve in accordance with one or more portions of one or more devices described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

A valve may be devised that provides a more compact profile when compared with typical valves, such as those used for fluid intake to a pressurized fluid dispensing system. Instead of disposing a hand wheel valve actuator in an offset position extending from the valve body, a compact design can have the actuator disposed in line with the fluid intake. A transmission may be used to transfer actuator movement to an internal flow control component, such as a ball-type flow controller. The compact design may allow for installation of the valve in locations that have size limitations, and/or may allow for more room in areas where prior non-compact valves are installed.

FIGS. 1A, 1B, 1C, 2A, 2B, 2C, 3A, 3B, 3C, 4A, 4B, and 4C are component diagrams illustrating external views of example implementations of valves 100, 300, 400, comprising environments in which one or more portions of one or more systems described herein may be implemented. In these implementations, a compact flow control valve comprises a valve body 102, an interior flow control element, such as a ball (e.g., 200, 500 in FIGS. 7-11), and an actuator 104. The valve body 102 can comprise a fluid inlet 106 and a fluid outlet 108. In one implementation, the fluid inlet can be configured to be selectably coupled to a hose, which may be coupled to a fluid source or tank; and the fluid outlet 108 can be configured to be selectably coupled to storage tank or fluid pump. Further, in these implementations, the fluid inlet 106 can be configured to be selectably coupled to an inlet cap 118. In one implementation, an example valve 100, 300, 400 can comprise an air bleeder valve 110, a pressure relief valve 112, and a valve position indicator 114. Additionally, an example valve 100, 300, 400 can comprise a longitudinal central axis "X" that is oriented generally in line with the flow of fluid when the valve is in the open position, a lateral central axis "Y" that is oriented generally perpendicular to the fluid flow and laterally across the valve body 102, and an elevation central axis "Z" that is oriented generally perpendicular to a plane formed by the X and Y axes.

With continued reference to FIGS. 1-4, FIG. 5 is a component diagram illustrating a perspective view of an example implementation of one or more portions of systems described herein; FIGS. 6A, 6B, and 6C are component diagrams illustrating example implementations of partial cut-away views of valves 100, 300, 400, which can comprise the compact design; and FIGS. 7A, 7B, 7C, 8A, and 8B are component diagrams illustrating example implementations of cut-away views of valves 100, 300, 400, which can comprise the compact design.

Figure 7A:
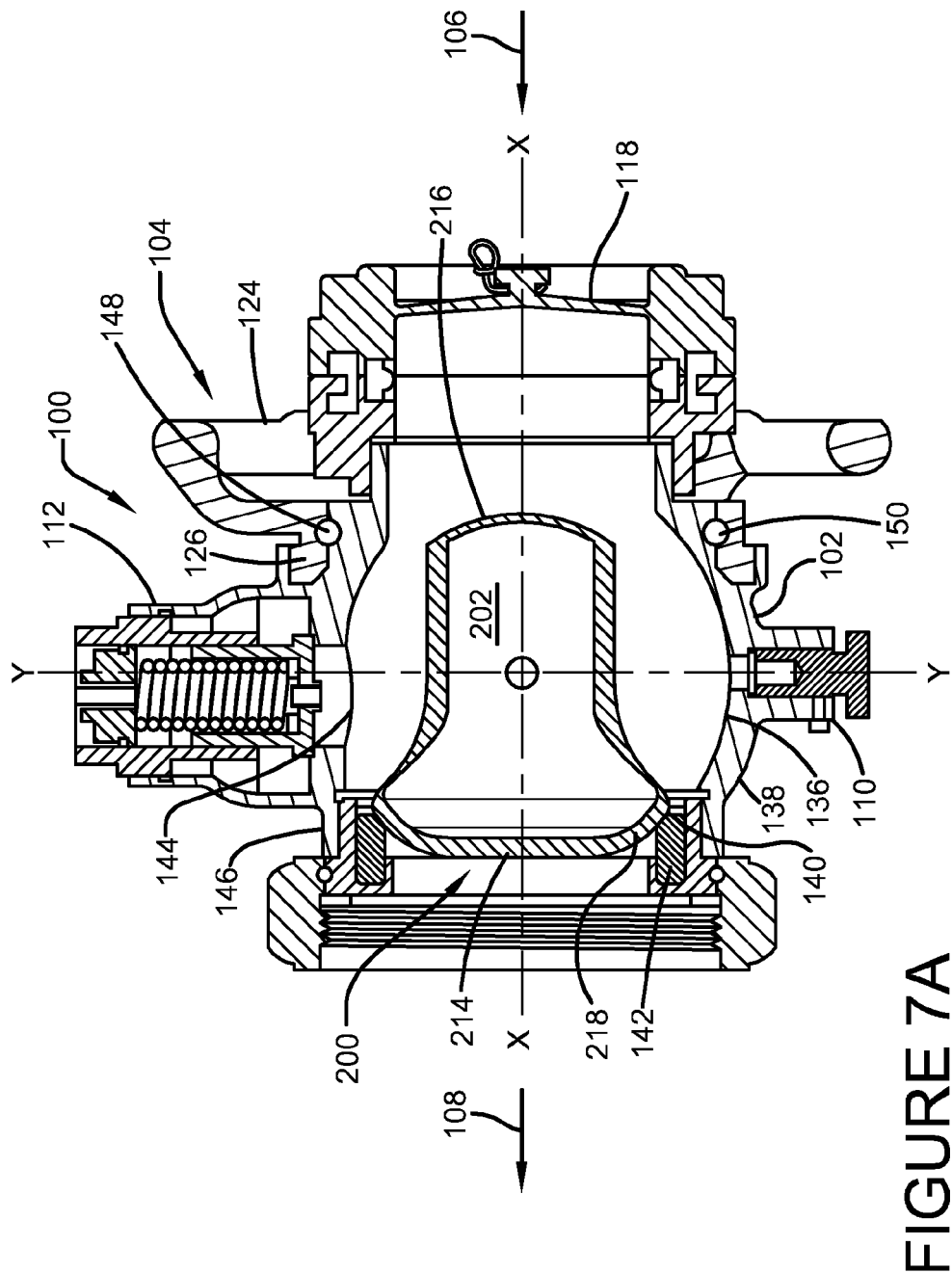
FIG. 7A is a component diagram illustrating a top cut-away view of an example implementation of a valve in accordance with one or more portions of one or more devices described herein.
Figure 7B:
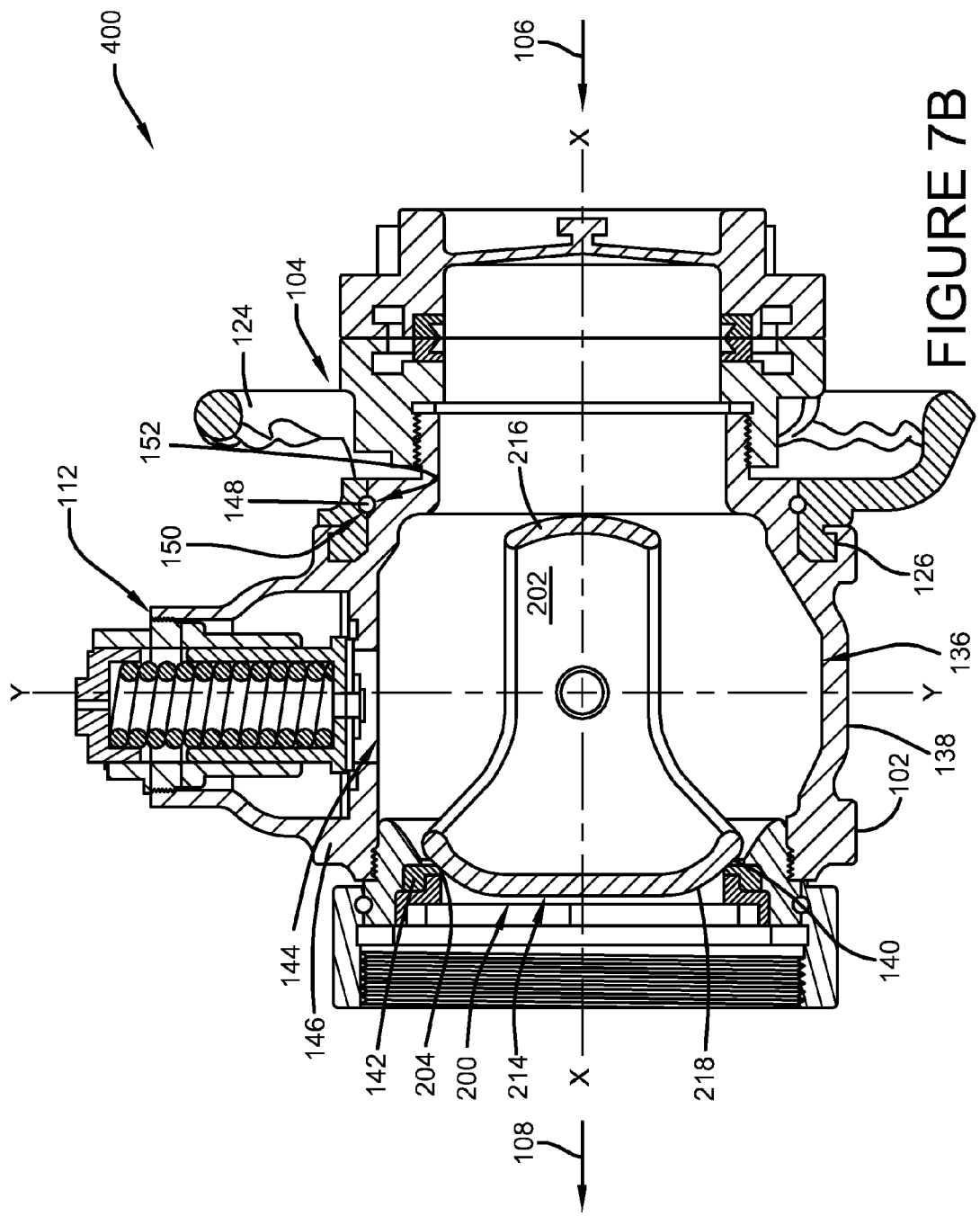
FIG. 7B is a component diagram illustrating a top cut-away view of another example implementation of a valve in accordance with one or more portions of one or more devices described herein.
Figure 7C:
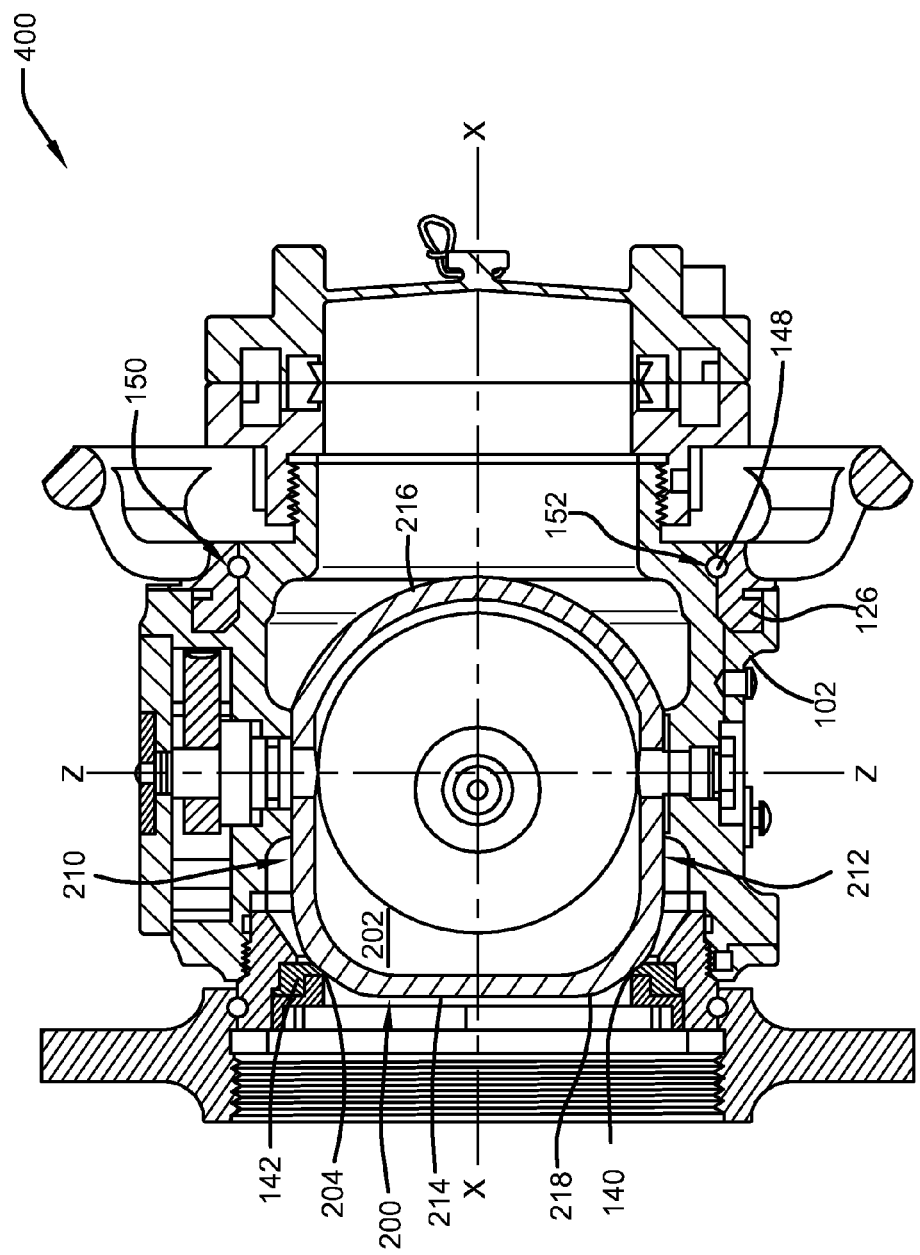
FIG. 7C is a component diagram illustrating a first side cut-away view of another example implementation of a valve in accordance with one or more portions of one or more devices described herein.
Figure 8A:
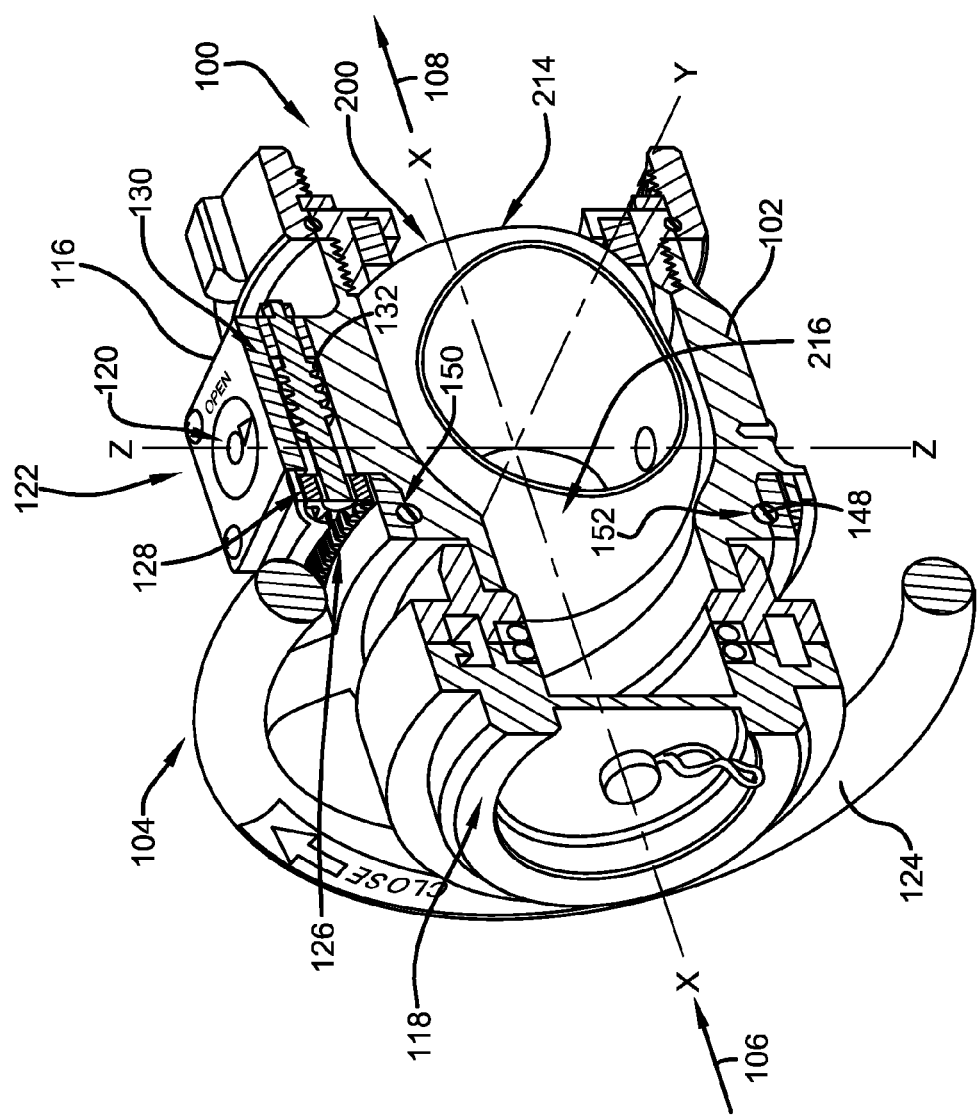
FIG. 8A is a component diagram illustrating a perspective cut-away view of an example implementation of a valve in accordance with one or more portions of one or more devices described herein.
Figure 8B:
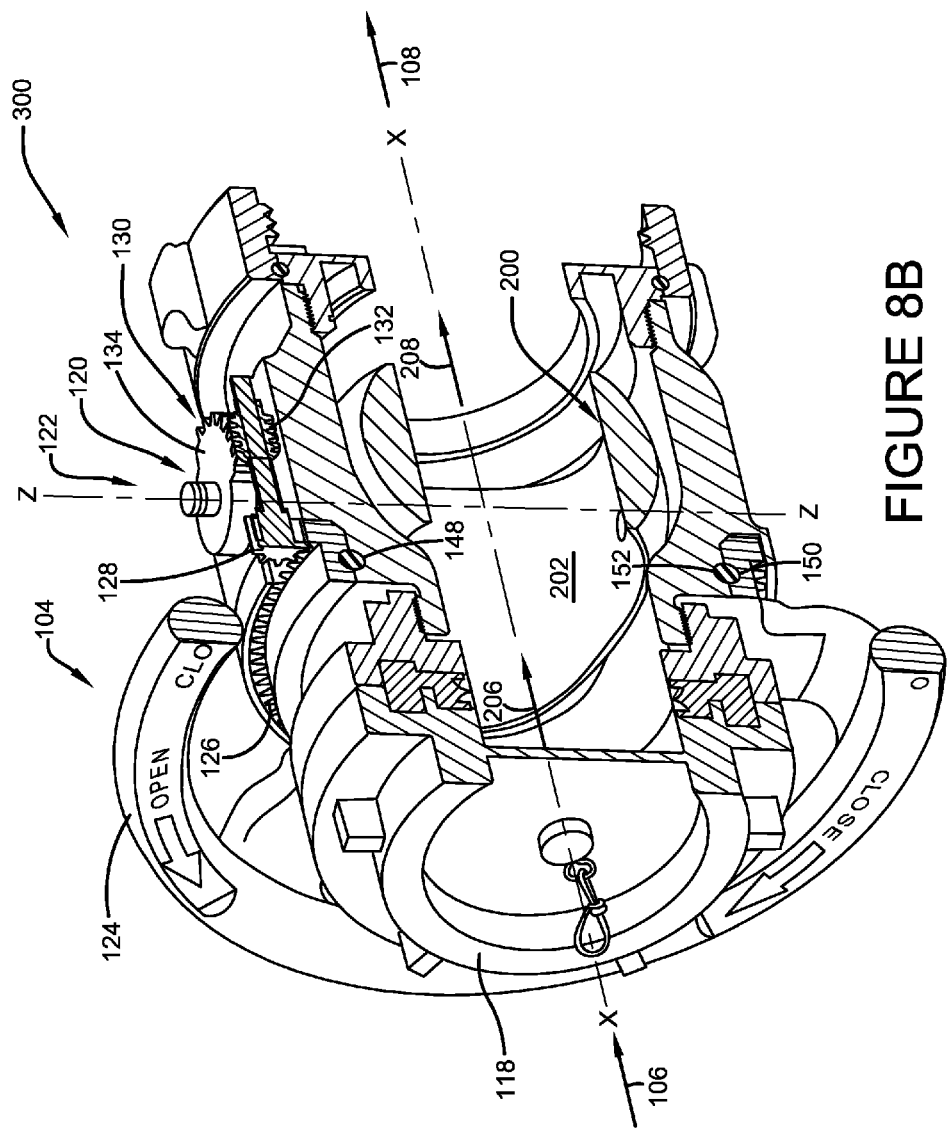
FIG. 8B is a component diagram illustrating a perspective cut-away view of another example implementation of a valve in accordance with one or more portions of one or more devices described herein.
Figure 9A:
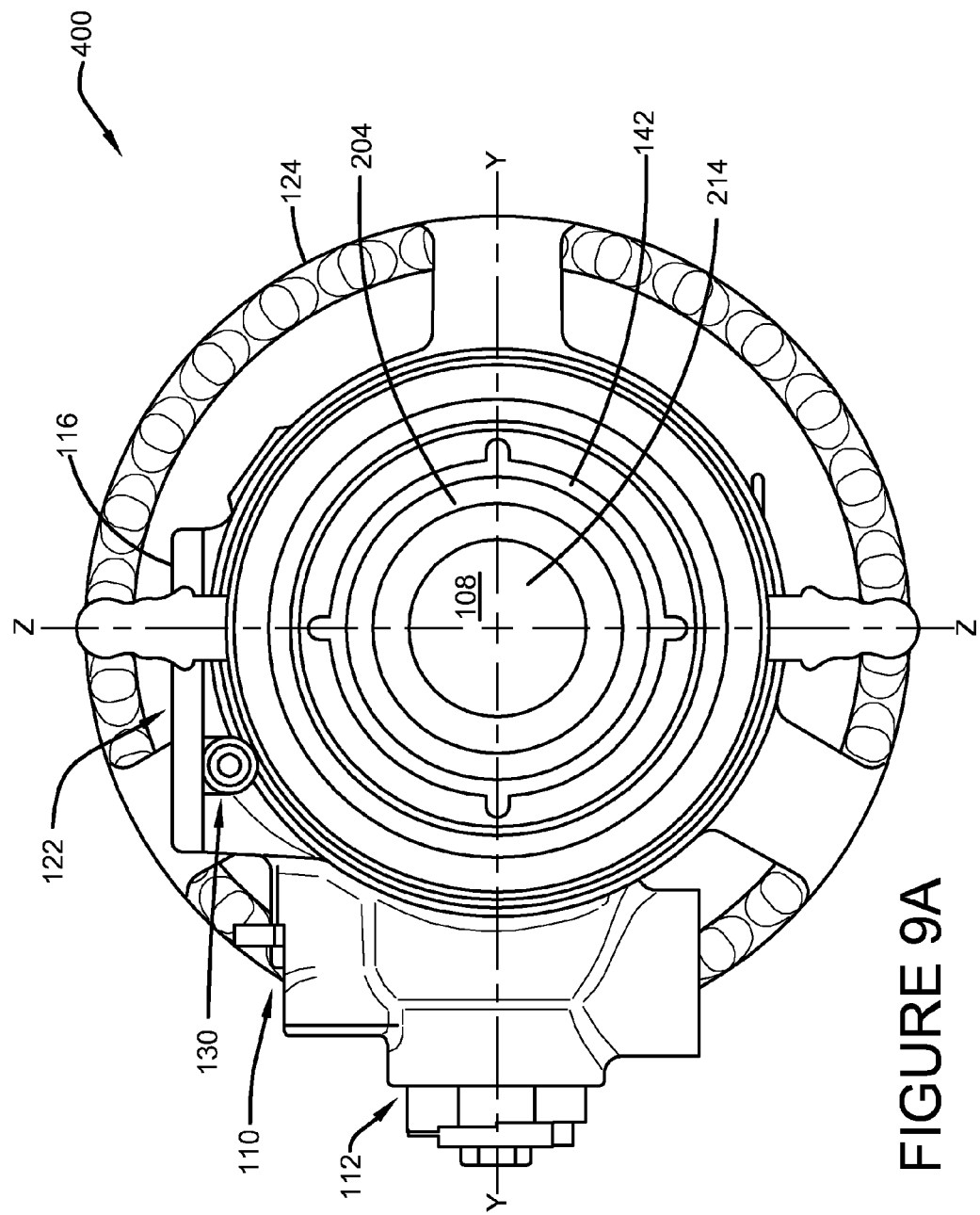
FIG. 9A is a component diagram illustrating a view from an outlet side of an example implementation of a valve in accordance with one or more portions of one or more devices described herein.
Figure 9B:
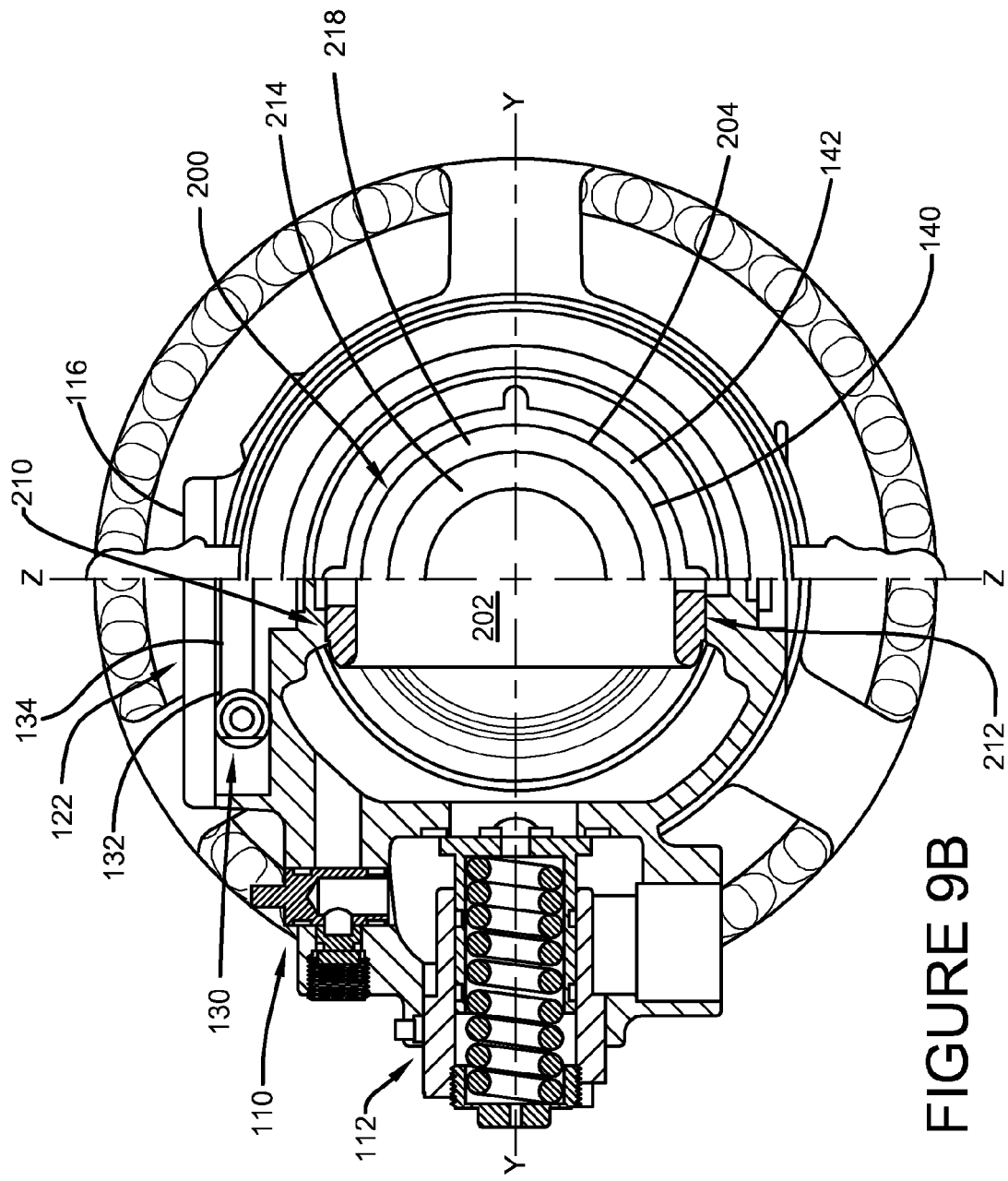
FIG. 9B is a component diagram illustrating a partial cut-away view from an outlet side of an example implementation of a valve in accordance with one or more portions of one or more devices described herein.
Figure 10B:
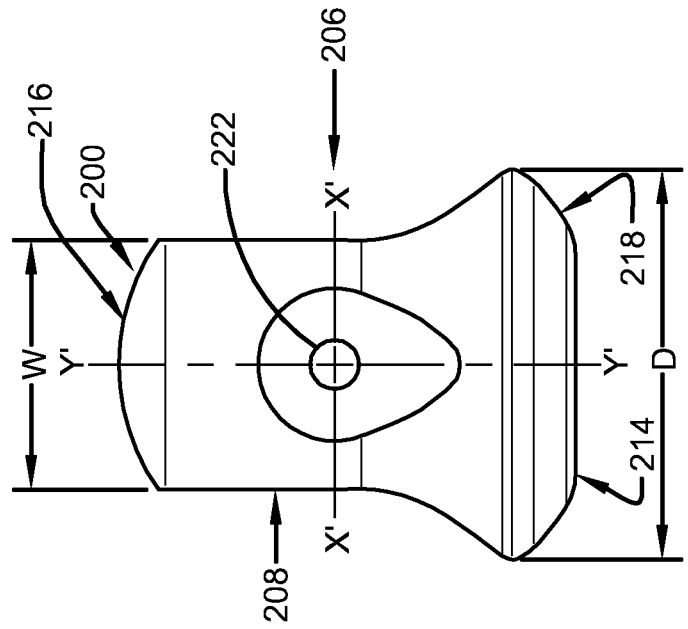
FIGS. 10A, 10B, 10C and 10D are component diagrams illustrating various views of an example implementation of one or more portions of a valve in accordance with one or more portions of one or more devices described herein.
Figure 10A:
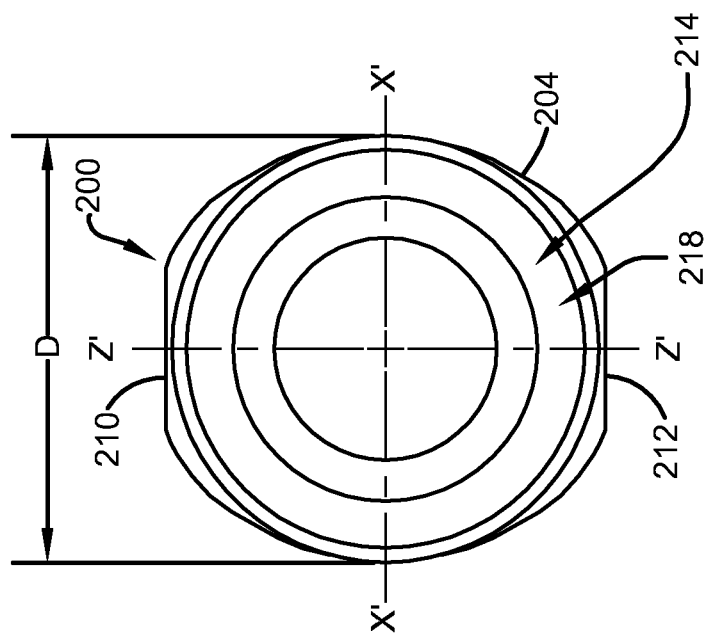
Figure 10C:
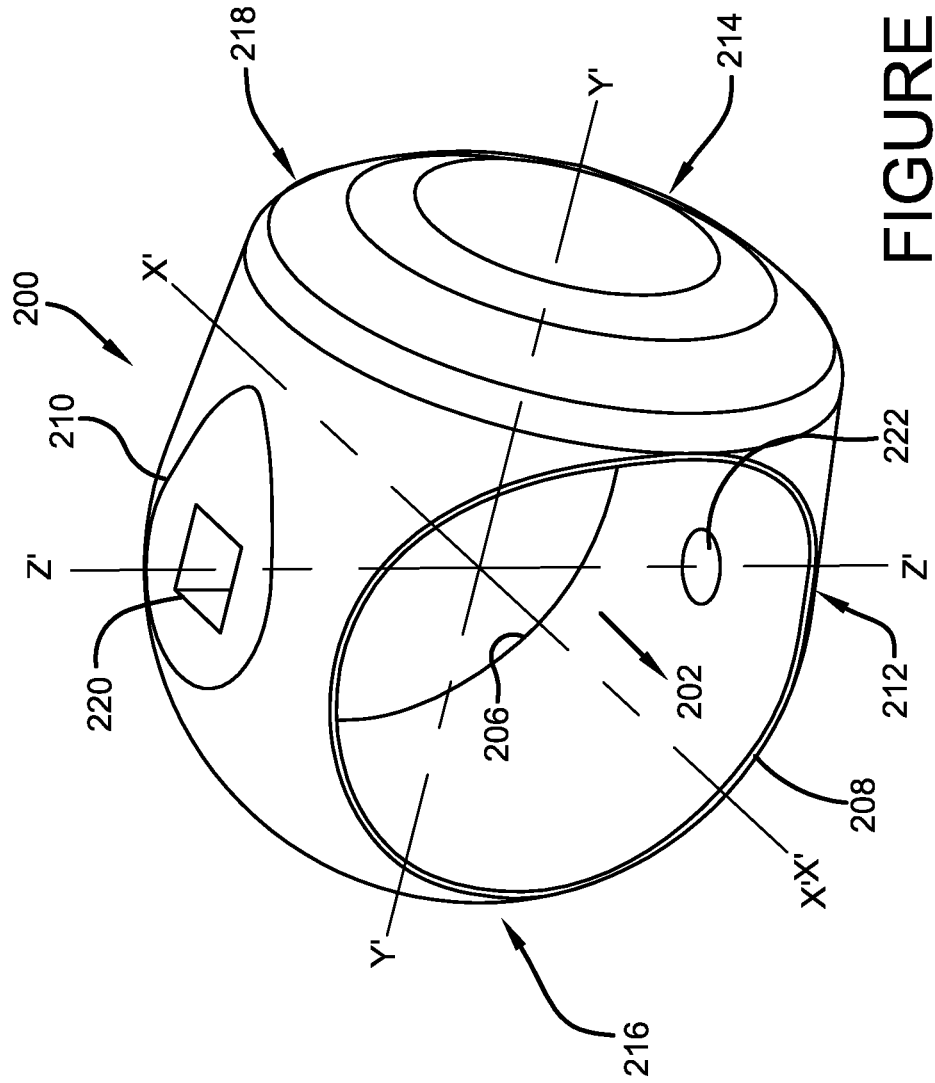
Figure 10D:
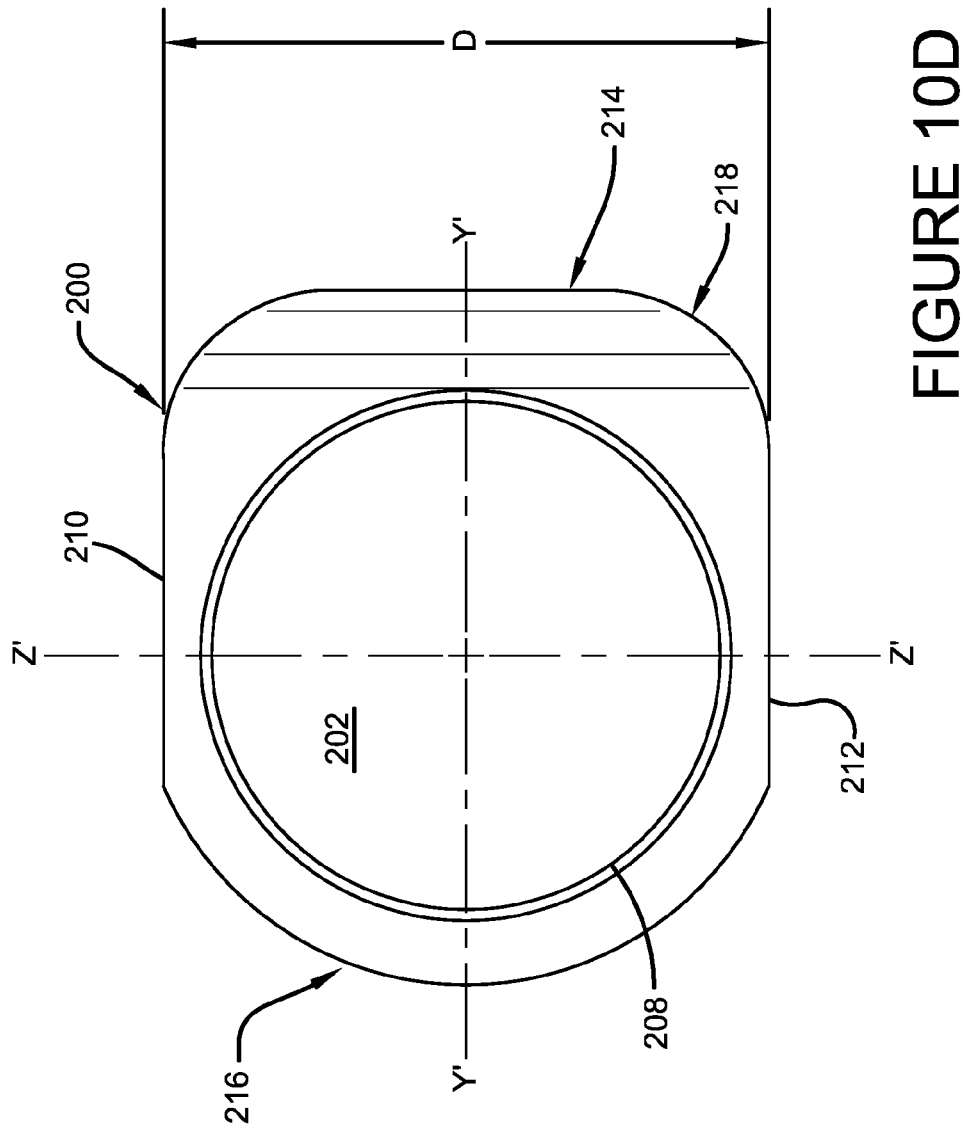

In one implementation, an exemplary valve 100, 300, 400 can comprise a flow control element 200, 500 that is configured to control a flow of fluid through the valve (e.g., from inlet 106 to outlet 108). As an example, a flow control element may comprise a rotating ball, gate, plug, piston butterfly, or a diaphragm component. In one implementation, as illustrated in FIGS. 7 and 8, the flow control element can comprise a ball-type component 200, which can be disposed in the valve body 102, and rotated between a closed position (e.g., FIGS. 7A, 7B, 7C, and 8A), and an open position (e.g., FIG. 8B).

Further, in this implementation, the exemplary valve can comprise a transmission 122 that is operably coupled with the flow control element 200. The transmission 122 is configured to adjust a position of the flow control element 200 (e.g., between open and closed) in response to actuation input. Additionally, the exemplary valve can comprise an actuator 104 that is operably coupled with the transmission 122. In this implementation, the actuator 104 can be configured to receive the actuation input; and the actuator is disposed on the valve 100, 300, 400 such that the flow of fluid (e.g., from inlet 106 to outlet 108, along the X axis) passes through a point of rotation of the actuator 104. For example, the point of rotation is the central point around which the actuator can be rotated.

In one implementation, the actuator 104 can comprise an annular member that, when force is applied to it as an application of rotational actuation input, generally rotates in a plane defined by the rotation around a central point located on that plane. As an illustrative example, the valve body 102 has a central longitudinal axis X that lies along a direction of the flow of fluid, and the point of rotation of the actuator 104 can lie on this central longitudinal axis X. In one implementation, the actuator 104 can comprise an inline spur gear 126 that is configured to transfer rotational force to the transmission in response to application of rotational actuation input. Further, in this implementation, as illustrated in the example valves 100, 300, 400, the rotational force applied to the actuator 104 can result in the inline gear 126 rotating (e.g., clockwise and counter-clockwise), and that rotation can be transferred to a coupling with the transmission 122.

In one implementation, the actuator 104 can be configured to rotate around an inlet side 106 of the valve body 102 on a bearing 148 that is operably coupling the actuator 104 with the valve body 102. For example, as illustrated in FIGS. 7 and 8, the actuator 104 can comprise an actuator bearing channel 150 that is disposed on an inside surface of the actuator 104; and the valve body 102 can comprise a valve body bearing channel 152 that is disposed around an outside surface of the valve body 102, at or near the fluid inlet side 106. In this example, the combination of the actuator bearing channel 150, the bearing 148, and the valve body bearing channel 152 may facilitate the rotation of the actuator 104 around the inlet side 106 of the valve body 102. In one implementation, the actuator 104 can comprise a first actuation input handle 124 (e.g., in FIGS. 1-4, and 6-9), which can be formed with the actuator 104, such as by casting, extruding, tooling, or some other method of forming. In another implementation, the actuator 104 can comprise a second actuation input handle 154 (e.g., in FIG. 7), which can be fastened to the actuator, such as by fasteners, rivets, soldering, brazing, welding, gluing, or some other form of fixed engagement.

Figure 5:
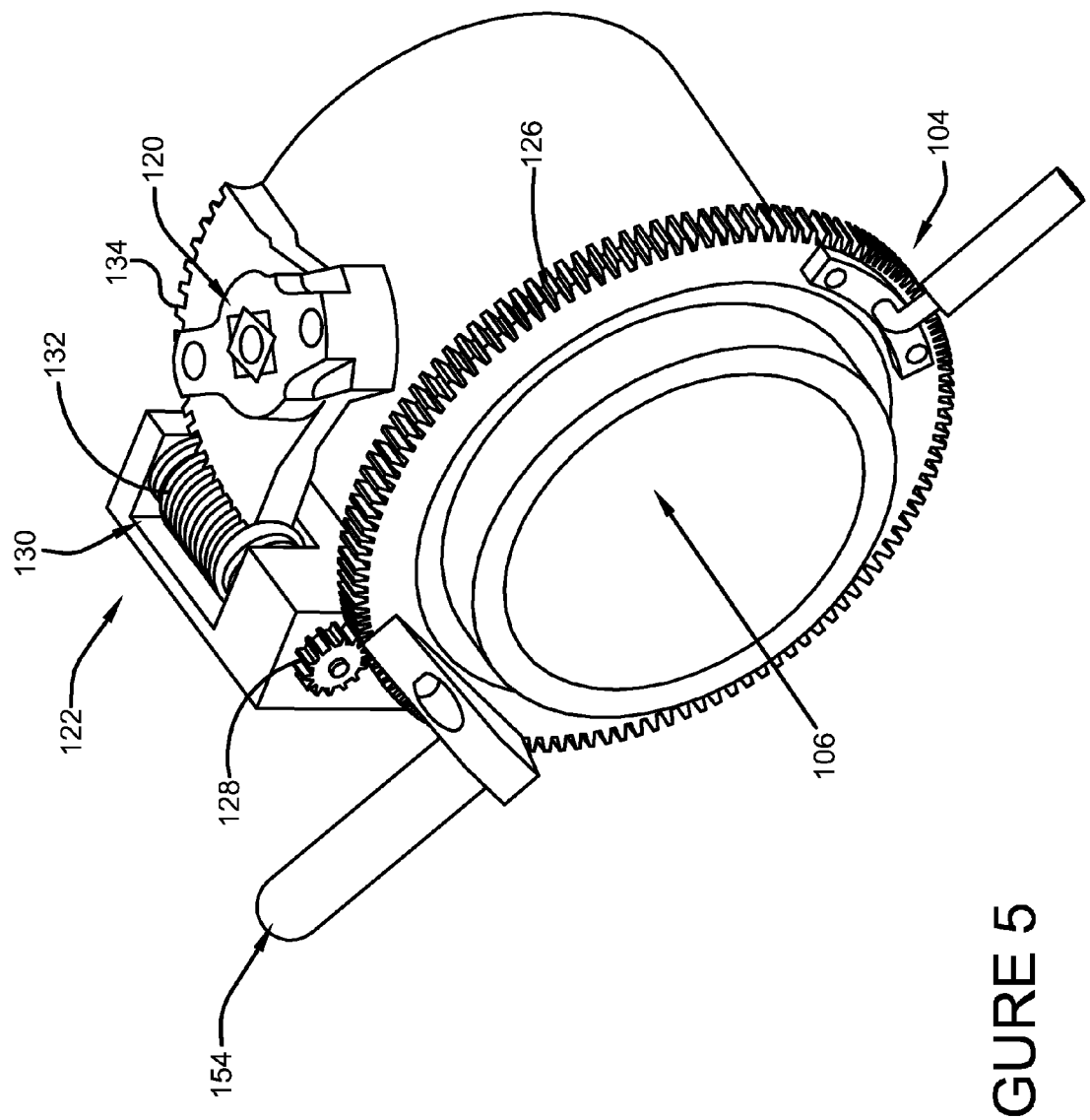
FIG. 5 is a component diagram illustrating a perspective view of an example implementation of one or more portions of a valve in accordance with one or more portions of one or more devices described herein.
Figure 6A:
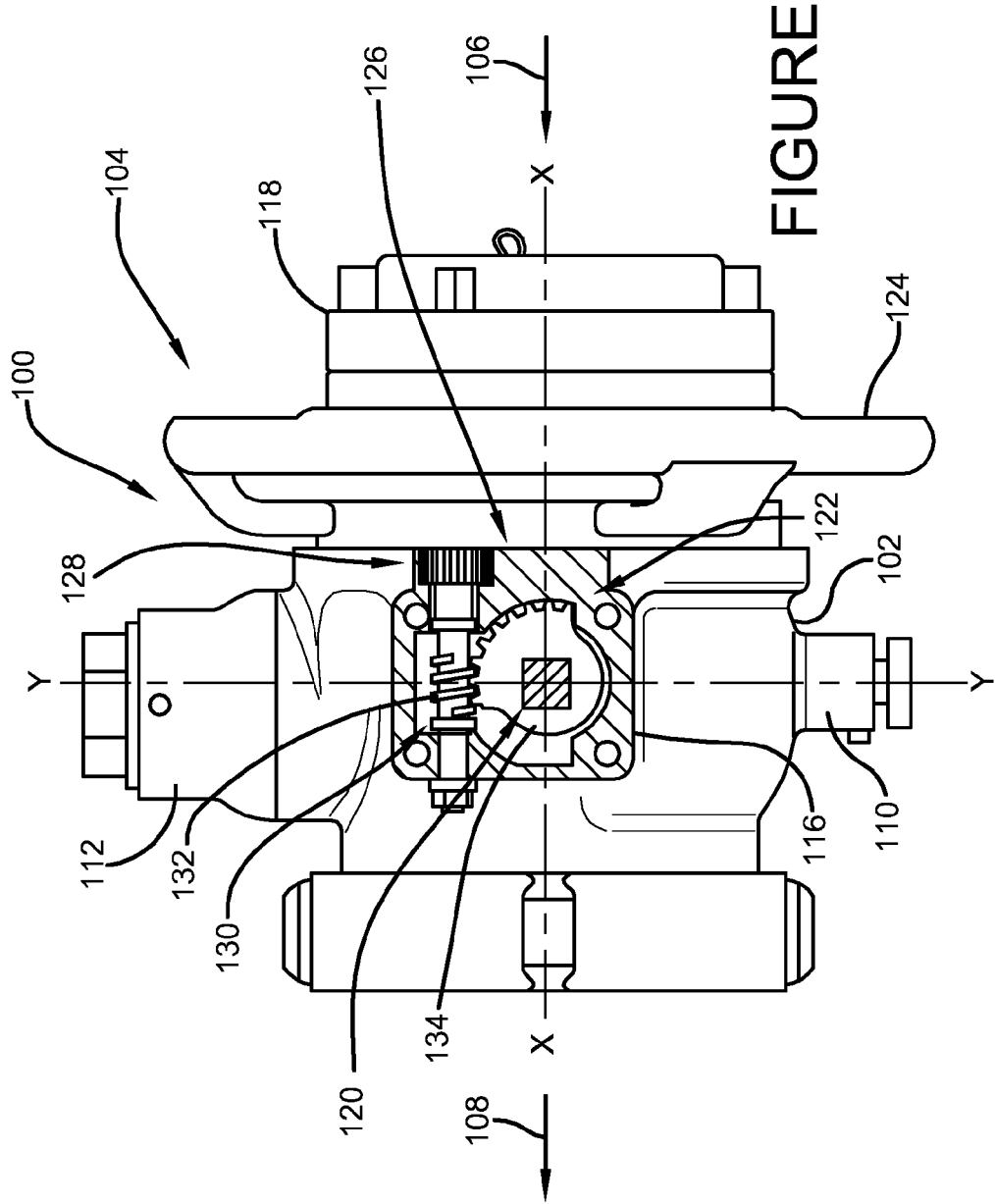
FIG. 6A is a component diagram illustrating a top partial cut-away view of an example implementation of a valve in accordance with one or more portions of one or more devices described herein.
Figure 6B:
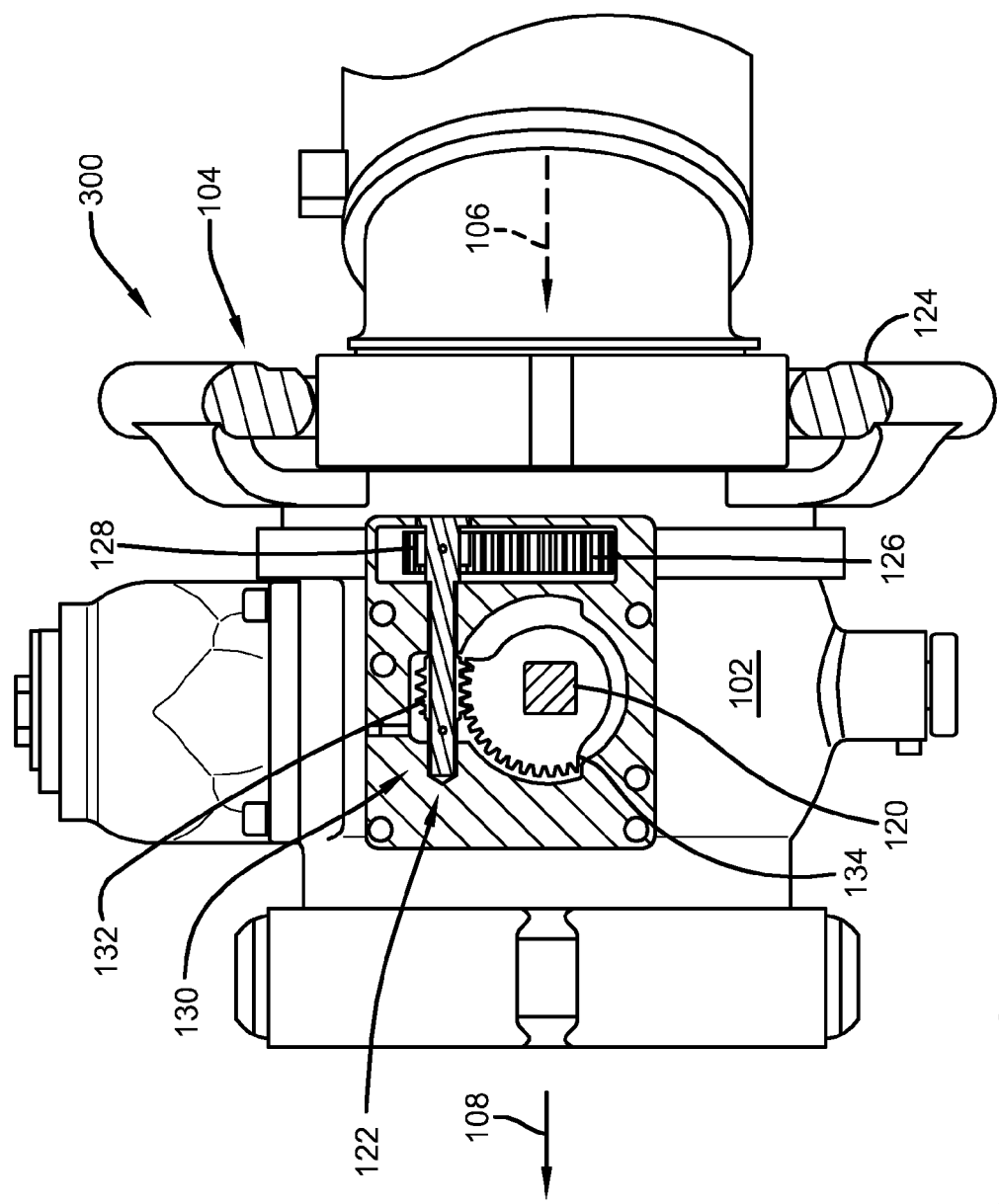
FIG. 6B is a component diagram illustrating a top partial cut-away view of another example implementation of a valve in accordance with one or more portions of one or more devices described herein.
Figure 6C:
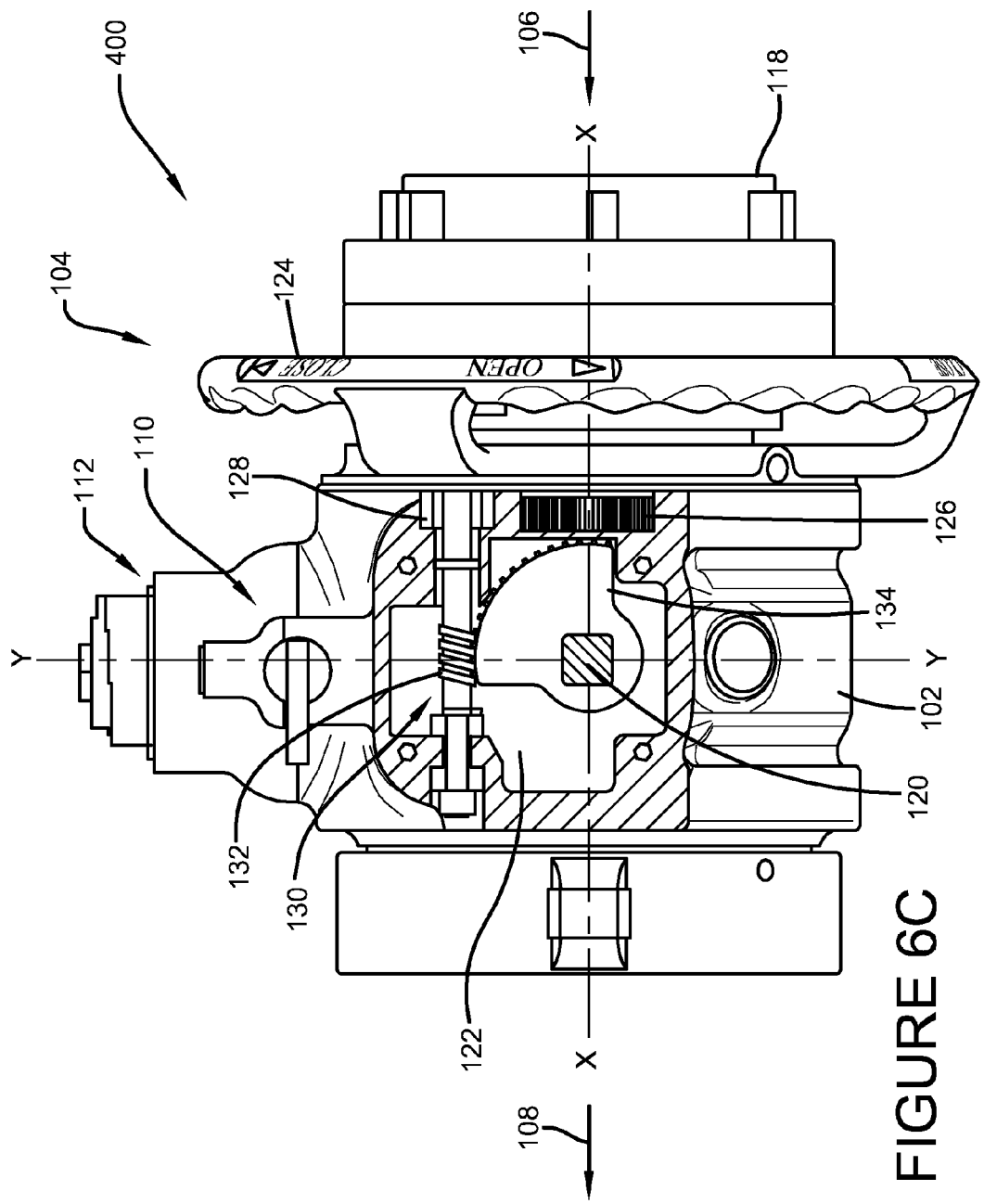
FIG. 6C is a component diagram illustrating a top partial cut-away view of yet another example implementation of a valve in accordance with one or more portions of one or more devices described herein.

In one implementation, as illustrated in FIGS. 5 and 6, the transmission 122 can comprise a spur gear 128 that is configured to operably couple with the actuator 104, for example, with the inline gear 126 of the actuator 104. As an example, the inline gear 126 of the actuator 104 may be configured to operably couple with the spur gear 128 of the transmission. In this way, in this example, rotation of the inline gear 126 can result in rotation of the transmission spur gear 128.

Further, in one implementation, the transmission 122 can comprise a worm drive 130 that is operably coupled with the spur gear 128. The worm drive can comprise a worm 132 and a worm gear 134. In this implementation, the worm 132 can be operably coupled to the transmission spur gear 128, and the worm gear 134 can be operably coupled with the worm 132, and can be configured to transfer the actuation input to the flow control element 102. For example, the transmission spur gear 128 can be fixed to a spindle comprising the worm 132, and the rotation of the transmission spur gear 128 can result in rotation of the spindle, and thus the worm 132. In one implementation, the transmission 122 can comprise a sectional gear (e.g., 134) that is operably coupled with the actuator 104 (e.g., through the worm 132 and transmission spur gear 128, or directly to the inline spur gear 126), and configured to transfer the actuation input to the flow control element 200 (e.g., through a coupler 120).

Additionally, for example, because the worm gear 134 is engaged with the worm 132, rotation of the worm 132 can result in rotation of the worm gear 134. In one implementation, the worm gear 134 can be operably engaged with a coupler 120, such as a stem, and the coupler can be operably engaged with the flow control element 200 disposed in the valve body 102. In this way, for example, rotation of the worm gear 134 can result in rotation of the coupler 120, resulting in rotation of the flow control element 200. Therefore, in this implementation, for example, rotation of the actuator 104 can result in adjustment of the flow control element 200.

As an illustrative example, the actuator 104 is coupled with a series of gears in the transmission 122, and is connected to and driven by a hand wheel 124. In this example, the hand wheel 124 can be configured to generally surround the inlet 106 of the example valve 100, 300, 400 such that a plane formed through the perimeter of the hand wheel is aligned generally coplanar with an YZ plane of the valve, and aligned generally perpendicular with the X axis. In one implementation, the hand wheel 124 may comprise a continuous annular member, or alternately, a partially continuous member, that is configured for gripping and application of rotational force by a user. In an alternative embodiment, a continuous or partially continuous annular member with one or more handles (e.g., 154 of FIG. 7) may be utilized with, or instead of, a hand wheel 124. The handles 154 may optionally be configured to be pivoted, moved, or removed into a storage position when not in use.

Further, in this illustrative example, the actuator can comprise the inline spur gear 126, having a diameter larger than that of the inlet side 106 of the valve body 102. The inline spur gear 126 can be configured to be generally coplanar with the hand wheel perimeter to surround the inlet 106 of the valve body 102, and to be rotatably coupled to the valve body 102. Ball or any other suitable type of bearings 148 may optionally be included in the rotatable coupling. The inline spur gear 126 can be configured to drive the smaller spur gear 128 that is connected to a self-locking worm gear drive 130. In this example, the spur gear 128 and worm gear drive 130 are disposed adjacent and coupled to the valve body 102. Additionally, the worm gear drive 130 comprises a worm 132 which drives a worm gear 134. The worm 132 is coupled with the spur gear 128, and the worm gear 134 of the worm drive 130 is engaged with and can rotate a trunnion actuator stem 120, which can actuate and rotates the flow control element 200, 500 (e.g., ball). In this example, the worm gear 134 can be configured to provide about ninety degrees of rotation of the flow control element 200 about the Z axis. In one or more implementations, the inline arrangement of the hand wheel 124 and inline spur gear 126 may be configured with any suitable gear ratio.

It should be understood that the systems and devices described herein are not limited to the implementations described above; and it is anticipated that those skilled in the art may devise alternate, suitable arrangements and types of gears to be used to transfer the actuation input drive from the actuator 104 to the flow control element 200, 500. Non-limiting example implementations may comprise using the actuator 104 to operate a large bevel gear driving a smaller bevel gear which is connected to parallel spur gears to drive the flow controlling element 200, 500, or a ball screw connected to the small spur which drives a trunnion. In other alternative embodiments, valve 100, 300, 400 may comprise an electrically or pneumatically assisted actuator, operated locally or remotely, such as by wire or wireless means.

Figures 11C, 11D:
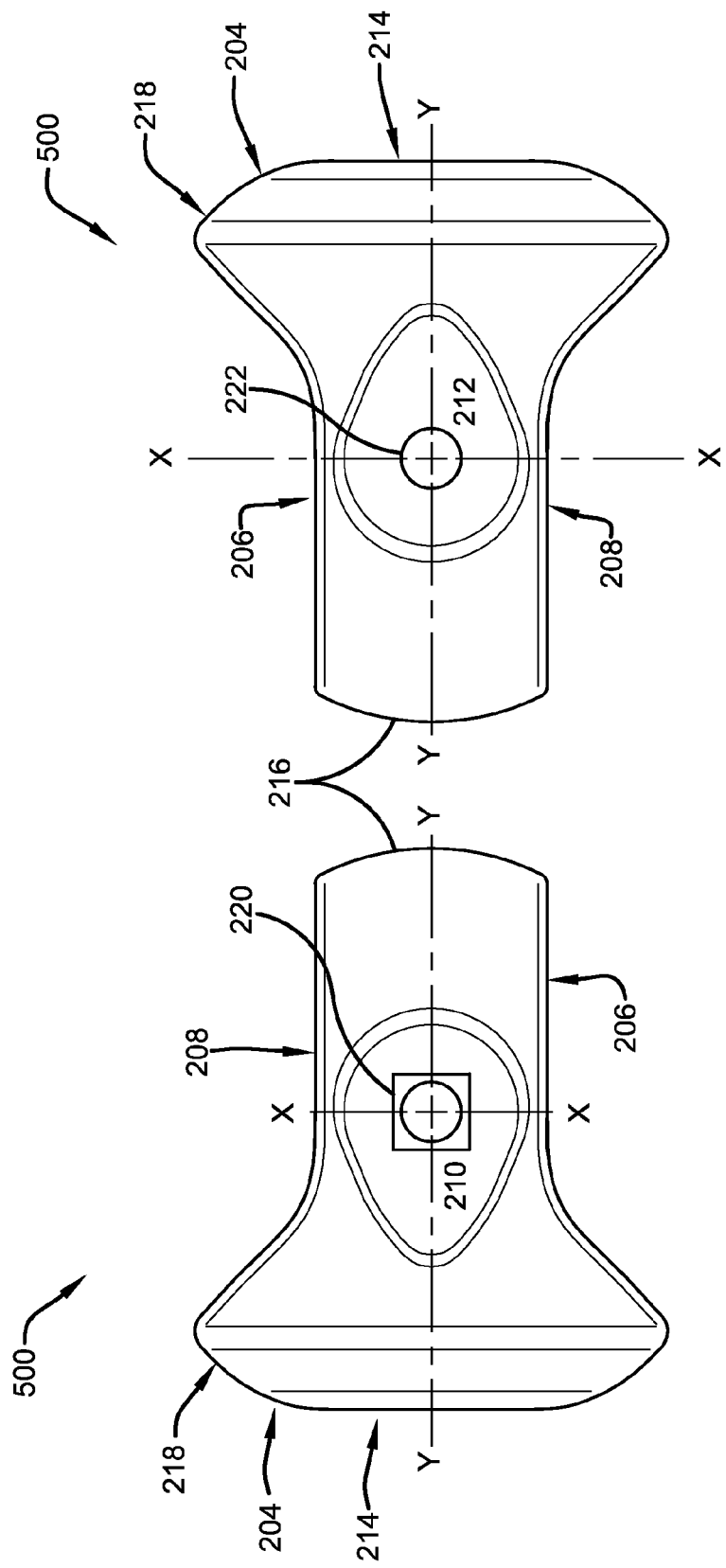

In one aspect, as illustrated in FIGS. 7A, 7B, 7C, 8A, 8B, 9A, 9B, 10A, 10B, 10C, 10D, 11A, 11B, 11C, 11D, 11E and 11F, the flow control element used in a compact valve can comprise ball-type control element 200, 500 ("ball"). As illustrated in FIGS. 10 and 11, the valve ball 200, 500 can comprise a first central axis "X" that is oriented generally parallel to the fluid flow through the interior bore 202, a second central axis "Y'" that is oriented generally perpendicular to the fluid flow through the sealing side 214 and base portion 216 of the ball 200, 500; and a third central axis "Z'" that is oriented generally perpendicular to the fluid flow and aligned with the stem receiver 220 and base stem receiver 222.

In this aspect, in one implementation, the ball 200, 500 can comprise an interior bore 202 configured as a fluid flow path, and an exterior sealing surface 204. In this implementation, the interior bore 202 can comprise an inlet side 206, configured as an entrance for the fluid to the ball 200, and an outlet side 208, configured as an exit for the fluid from the ball 200, 500. Further, the exterior sealing surface 204 can comprise two pairs of opposing sides generally parallel to the flow path, respectively contoured with accordingly. A first pair of sides, comprising the top side 210 and bottom side 212 of the ball 200, 500, can be configured for rotatable mounting to the valve body 102. In this implementation, the bottom side of the ball can rotatably couple with the valve body 102 using a base stem receiver 222; and the top side 210 of ball 200, 500 can be configured to rotatably couple with the top side of the valve body 102 and to fixedly engage to the coupler stem 120 extending from the transmission 122, using a stem receiver 220. Additionally, a second pair of sides is disposed generally perpendicular to the first pair of sides, and comprise a sealing side 214 and a base portion 216.

In one implementation, the sealing side 214 can comprise an annular convex sealing surface 218 disposed about the Y' axis, and having an outer diameter D. In one implementation, the sealing surface 218 may be formed with the ball 200, 500; and in another implementation, the sealing surface 218 may be a separate component that is fixedly engaged with the ball 20, 500. The convex sealing surface 218 may be configured to be disposed adjacent a first portion 136 of the valve body 102, formed about the Y axis on a first side 138 of the valve body 102, when the valve 100, 300, 400 is disposed in an open position (e.g., FIG. 8B). Further, the convex sealing surface 218 may be configured seal against a sealing surface 140 of an annular seat 142, disposed about the X axis on an outlet side 108 of the valve body 102, when the valve is disposed in a closed position (e.g., FIGS. 7A-C, 8A, 9A, and 9B). In one implementation, the annular convex sealing surface 218 may comprise a raised portion of the ball 200, 500 (e.g., FIGS. 10B, D, 11C-E).

In one implementation, the first side 138 of the valve body 102 can comprise a fluid path for the bleed valve 110 (e.g., FIG. 7A). In this implementation, for example, when the example valve 100, 300, 400, is viewed from the top, the ball 200, 500 may be rotated clockwise relative to the Z' axis from the open position to the closed position. In an alternative embodiment, the valve 100, 300, 400 may be configured with the sealing side 214 and the base portion 216 mounted in opposite locations relative to the Z axis (mirrored along the X-Z plane). In this arrangement the ball 200, 500 may be rotated counter-clockwise relative to the Z axis to change the valve 100, 300, 400 from the open to the closed position. In another alternative embodiment, the valve 100, 300, 400 may be configured such that the sealing side 214 operates to seal a sealing surface of an annular seat formed about the X axis on the inlet side 106 of the valve body 102 (not shown) when the valve 100, 300, 400 is in the closed position.

In one implementation, the base portion 216 comprises a spherical cap shaped surface (e.g., generally spherical surface) formed about the Y' axis, and comprising a reduced width W, the width being measured parallel to the X' axis. The base portion 216 is configured to be disposed adjacent a corresponding second portion 144 of the valve body 102, formed about the Y axis on a second side 146 of the valve body 102, when the valve 100 is disposed in the open position. In this implementation, the base portion 216 is configured to face toward the inlet side 106 of the valve body 102 when the valve 100, 300, 400 is disposed the closed position. In one implementation, the second side 146 of the valve body 102 may comprise a fluid path for the relief valve 112 (e.g., FIG. 7A); or may comprise a fluid path for both the relief valve 112 and the bleed valve 110 (e.g., FIGS. 7B, 7C, 9A, 9B).

In this implementation, when the example valve 100, 300, 400 is viewed from the top, the ball 200, 500 can be rotated in a clockwise direction relative to the Z axis from the open position to the closed position. In one embodiment, the width W of the base portion 216 is less than the diameter D of the sealing side 214. In an alternative embodiment, the valve body 102 and actuator 104 are configured so the base portion 216 operates to face toward the outlet side 108 of the valve body when the valve 100 is in the closed position.

In one implementation where the example valve 100, 300, 400 may be utilized, the fluid outlet side 108 can be fluidly coupled with a pump suction fitting on a pump panel (e.g., on a fire engine). In this implementation, the valve 100, 300, 400 can be connected to the pump suction with the valve in the closed position, and with the inlet cap 118 in place. In this implementation, for example, in the closed position, the sealing side 214 can seat against the sealing surface 140 of seat 142 on the valve outlet side 108, and may be generally aligned with the X axis. In a non-limiting example, when a pressurized supply source is used, such as a hydrant, the inlet cap 118 can be removed and a hose can be coupled from the valve inlet 106 to the supply source. Further, in this example, the hose may be filled and pressurized, and the air bleeder valve 110 can be opened to release trapped air from the hose and valve 100 300, 400. Once the excess air has been bled, for example, the air bleeder valve 110 can be closed and the valve 100, 300, 400 can be opened accordingly, by rotational force application to the actuator 104, which may place the valve 100, 300, 400 in the open position.

As one example, rotating the hand wheel 124 of the actuator 104, about the X axis, may result in rotation of the inline spur gear 126, which may further result in rotation of the coupled transmission spur gear 128. In this example, rotation of the transmission spur gear 128 can drive the worm gear drive 130, which can cause the worm 132 to drive the worm gear 134. Additionally, the worm gear 134 is engaged with the coupler stem 120, and the rotation of the worm gear can result in rotation of the ball 200, 500. In this example, when the ball 200, 500 is rotated to the open position, the sealing side 214 is disposed adjacent the first portion 136 of the valve body 102, and is generally aligned with the Y axis.

It is understood that the various components of valve 100, 300, 400 may be made from any materials suitable for use with the valve and the expected environment including, without limitation, metal, plastic, flexible materials such as rubber, and composites. In addition, the various components of valve 100, 300, 400 may be formed in any conventional manner including, without limitation, casting, machining, forming, molding and stamping. Furthermore, the various components of valve 100, 300, 400 may be finished in any conventional manner, such as painting, coating or plating, or may be left unfinished. Additionally, the actuator 104 of valve 100, 300, 400 may be used to control different types of flow control elements within the scope of the invention. A non-limiting example may include an outer interior baffle with one or more flow port openings that are selectably alignable with corresponding flow port openings on an inner interior baffle or member, whereby one or both baffles are rotatable relative to each other. Another non-limiting example may include one or more interior baffle plates, each having a plurality of overlapable or retractable sections. Yet another non-limiting example is a gate valve. Lastly, the various components of valve 100, 300, 400 may be combined, integrated and assembled together in any conventional manner.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A valve, comprising:
   a flow control element configured to control a flow of fluid through the valve;
   a transmission operably coupled with the flow control element, and configured to adjust a position of the flow control element in response to an actuation input force; and
   an actuator operably-coupled with the transmission, the actuator comprising an actuator input receiver handle that receives the actuation input force, and mechanically transfers the actuation input force through an inline spur gear disposed in contact with the actuator input receiver handle to the transmission, the flow of fluid passing through the point of rotation around which the actuator input receiver handle rotates.

2. The valve of claim 1, comprising a valve body having a central longitudinal axis that lies along a direction of the flow of fluid, the point of rotation of the actuator lying on the central longitudinal axis.

3. The valve of claim 1, the inline spur gear of the actuator engaged with a transmission spur gear to transfer rotational force to the transmission in response to the application of a rotational actuation input to the actuator input receiver.

4. The valve of claim 1, the actuator configured to rotate around an inlet side of a valve body on a bearing operably coupling the actuator with the valve body.

5. The valve of claim 1, the actuator comprising one of:
   an actuation input handle formed with the actuator; and
   an actuation input handle fastened to the actuator.

6. The valve of claim 1, the transmission comprising one or more of:
   a spur gear configured to operably couple with the actuator, the spur gear coupled with a drive configured to transfer the actuation input to the flow control element; and
   a worm drive operably coupled with the actuator, the worm drive comprising:
      a worm operably coupled with the actuator; and a worm gear operably coupled with the worm and configured to transfer the actuation input to the flow control element.

7. The valve of claim 1, the transmission comprising a sectional gear operably coupled with the actuator, and configured to transfer the actuation input to the flow control element.

8. The valve of claim 1, the flow control element comprising a sealing side and a base side, the base side comprising a width less than a diameter of the sealing side.

9. The valve of claim 8, the sealing side comprising a convex-shaped sealing side configured to engage with a sealing surface of a valve seat disposed at an outlet side of the valve to mitigate the flow of fluid through the valve.

10. The valve of claim 8, the sealing side comprising a convex-shaped sealing side comprising a spherical segment-shaped surface having a spherical zone configured to engage with a sealing surface of a valve seat disposed at an outlet side of the valve to mitigate the flow of fluid through the valve, and the base side comprising a spherical diameter less than a diameter of the sealing side.

11. The valve of claim 1, the flow control element configured to rotate ninety degrees laterally in the valve between an open position and a closed position.

12. An apparatus for controlling fluid flow, comprising an actuator disposed on a valve, comprising an actuator input receiver handle that receives a rotational actuation input, a point of rotation around which the actuator rotates is disposed in a path of fluid flow of the valve, the actuator comprising an inline spur gear disposed in contact with the actuator input receiver handle to mechanically transfer the rotational actuation input from the actuator input receiver handle to a transmission; and
the transmission operably coupled with the inline spur gear of the actuator, and configured to transfer the rotational actuation input received from the inline spur gear to a flow control coupler engaged with a flow control element configured to control a flow of fluid through the valve in response to the rotational actuation input.

13. The apparatus of claim 12, the transmission comprising a sectional gear operably coupled with the actuator, and configured to transfer the rotational actuation input to the flow control coupler.

14. The apparatus of claim 12, the transmission comprising a spur gear configured to engage with the inline spur gear disposed on the actuator, and configured to receive the rotational actuation input from the inline spur gear.

15. The apparatus of claim 14, the transmission comprising a worm drive operably coupled to the spur gear, the worm drive comprising a worm operably engaged with a worm gear, the worm gear operably coupled with the flow control coupler.

16. The apparatus of claim 12, the actuator comprising an actuator bearing channel disposed on its inner surface, the actuator bearing channel configured to engage with a bearing disposed in a valve body bearing channel disposed on a valve body of the valve, the bearing configured to facilitate rotation of the actuator around an inlet portion of the valve body.

17. The apparatus of claim 12, the actuator comprising one of:
the actuation input handle formed with the actuator; and
the actuation input handle fastened to the actuator.

18. The apparatus of claim 12, the flow control element configured to rotate in the valve between an open position and closed position, resulting from an application of a rotational force to the coupler by the transmission.

19. The valve of claim 1, the point of rotation of the actuator lying on a central longitudinal axis of the valve, the central longitudinal axis lying along a direction of fluid flow.

20. An inlet valve, comprising:
a flow control element configured to control a flow of fluid through the valve;
a transmission operably coupled with the flow control element, and configured to adjust a position of the flow control element in response to an actuation input, the transmission comprising:
a spur gear configured to operably couple with an actuator; and
a worm drive operably coupled with the spur gear, the worm gear drive comprising:
a worm operably coupled with the spur gear; and
a worm gear operably coupled with the worm and configured to transfer the actuation input to the flow control element; and
the actuator comprising an inline gear operably coupled with the spur gear of the transmission, the flow of fluid passing through a point of rotation of the actuator, the actuator configured to:
rotate around an inlet side of a valve body on a bearing operably coupling the actuator with the valve body; and
apply a rotational actuation input to the transmission.

\* \* \* \* \*